United States Patent
Francois et al.

(10) Patent No.: US 11,991,373 B2
(45) Date of Patent: May 21, 2024

(54) METHOD AND DEVICE FOR PICTURE ENCODING AND DECODING

(71) Applicant: InterDigital VC Holdings, Inc., Wilmington, DE (US)

(72) Inventors: Edouard Francois, Bourg des Comptes (FR); Fabrice LeLeannec, Mouazé (FR); Tangi Poirier, Thorigné-Fouillard (FR)

(73) Assignee: InterDigital VC Holdings, Inc., Wilmington, DE (US)

(*) Notice: Subject to any disclaimer, the term of this patent is extended or adjusted under 35 U.S.C. 154(b) by 65 days.

(21) Appl. No.: 17/434,152

(22) PCT Filed: Feb. 25, 2020

(86) PCT No.: PCT/US2020/019626
§ 371 (c)(1),
(2) Date: Aug. 26, 2021

(87) PCT Pub. No.: WO2020/176459
PCT Pub. Date: Sep. 3, 2020

(65) Prior Publication Data
US 2023/0300351 A1    Sep. 21, 2023

(30) Foreign Application Priority Data

Feb. 28, 2019 (EP) .................................... 19305236
Mar. 11, 2019 (EP) .................................... 19305281
(Continued)

(51) Int. Cl.
*H04N 19/186* (2014.01)
*H04N 19/119* (2014.01)
*H04N 19/176* (2014.01)

(52) U.S. Cl.
CPC ......... *H04N 19/186* (2014.11); *H04N 19/119* (2014.11); *H04N 19/176* (2014.11)

(58) Field of Classification Search
CPC ... H04N 19/186; H04N 19/119; H04N 19/176
(Continued)

(56) References Cited

U.S. PATENT DOCUMENTS

2015/0071344 A1    3/2015  Tourapis et al.
2015/0373349 A1*  12/2015  Zhang .................... H04N 19/14
                                                           375/240.02
(Continued)

FOREIGN PATENT DOCUMENTS

JP    2021-513284 A    5/2021
JP    2021-518088 A    7/2021
(Continued)

OTHER PUBLICATIONS

Francois et al., "Chroma residual scaling with separate luma/chroma tree", Joint Video Experts Team (JVET) of ITU-T SG 16 WP 3 and ISO/IEC JTC 1/SC 29/WG 11, Document: JVET-N0389r2, 14th Meeting, Geneva, Switzerland, Mar. 19, 2019, 12 pages.
(Continued)

*Primary Examiner* — Allen C Wong
(74) *Attorney, Agent, or Firm* — CONDO ROCCIA KOPTIW LLP

(57) ABSTRACT

A cross-component dependent tool to be used for a chroma block of a picture is enabled responsive to a size of said chroma block and to a size of at least one luma block co-located with the chroma block. Then, the chroma block is decoded responsive to said enablement of said cross-component dependent tool. A encoding and decoding methods are presented as well as encoding and decoding devices.

16 Claims, 18 Drawing Sheets

(30) Foreign Application Priority Data

| | | | |
|---|---|---|---|
| Mar. 18, 2019 | (EP) | ................................. | 19305326 |
| Mar. 25, 2019 | (EP) | ................................. | 19305373 |
| Apr. 10, 2019 | (EP) | ................................. | 19305465 |
| May 9, 2019 | (EP) | ................................. | 19305591 |
| May 17, 2019 | (EP) | ................................. | 19305633 |
| May 29, 2019 | (EP) | ................................. | 19305684 |
| Jul. 2, 2019 | (EP) | ................................. | 19305904 |

(58) Field of Classification Search
USPC .................................................. 375/240.02
See application file for complete search history.

(56) References Cited

U.S. PATENT DOCUMENTS

| | | | |
|---|---|---|---|
| 2017/0295365 A1 | 10/2017 | Budagavi et al. | |
| 2018/0176594 A1 | 6/2018 | Zhang et al. | |
| 2018/0324420 A1* | 11/2018 | Wang | ................... H04N 19/103 |

FOREIGN PATENT DOCUMENTS

| | | |
|---|---|---|
| RU | 2604986 C2 | 12/2016 |
| WO | WO 2016154008 A1 | 9/2016 |
| WO | 2019/160986 A1 | 8/2019 |
| WO | 2019/213198 A1 | 11/2019 |

OTHER PUBLICATIONS

Karczewicz et al., "JVET AHG report: Tool evaluation (AHG1)", Joint Video Exploration Team (JVET) of ITU-T SG 16 WP 3 and ISO/IEC JTC 1/SC 29/WG 11, Document JVET-G0001, 7th meeting, Torino, Italy, Jul. 13, 2017, 6 pages.

Francois et al., "CE12: Summary report on mapping functions", Joint Video Experts Team (JVET) of ITU-T SG 16 WP 3 and 1S0/IEC JTC 1/SC 29/WG 11, Document: JVET-M0032r1, 13th Meeting: Marrakech, Morocco, Jan. 9, 2019, 6 pages.

Lu et al., "CE12: Mapping functions (test CE12-1 and CE12-2)", Joint Video Experts Team (JVET) of ITU-T SG 16 WP3 and ISO/IEC JTC 1/SC 29/WG 11, Document: JVET-M0427-v2, 13th Meeting, Marrakech, Morroco, Jan. 9, 2019, 15 pages.

Chen et al., "Algorithm description of Joint Exploration Test Model 7 (JEM7)", Joint Video Exploration Team (JVET) of ITU-T SG 16 WP 3 and ISO/IEC JTC 1/SC29/WG 11, Document: JVET-G1001-v1, 7th Meeting, Torino, Italy, Jul. 13, 2017, 50 pages.

Anonymous, "Series H: Audiovisual and Multimedia Systems, Infrastructure of audiovisual services–Coding of moving video, High efficiency video coding", ITU-T H.265 Telecommunication Standardization Sector of ITU, Recommendation ITU-T H.265, Oct. 2014, 540 pages.

Anonymous, "Information Technology—Generic Coding of Moving Pictures and Associated Audio Information: Video", International Organization for Standardization (ISO) and the International Electrotechnical Commission (IEC), International Standard 13818-2, Recommendation ITU-T H.262, Document ISO 13818-2: 1995 (E), 1995, 255 pages.

Bross et al., "JVET AHG report: Draft text and test model algorigthm description editing (AHG2)", Joint Video Experts Team (JVET) of ITU-T SG 16 WP 3 and ISO/IEC JTC 1/SC 29/WG 11, Document JVET-M0002-v3, 13th Meeting: Marrakech, Morocco, Jan. 9, 2019, 6 pages.

Anonymous, "Information technology—Generic coding of moving pictures and associated audio information: Systems", International Telecommunication Union, ITU-T Telecommunication Standardization Sector of ITU, Series H: Audiovisual and Multimedia Systems—Infrastructure of audiovisual services—Transmission multiplexing and synchronization, Recommendation ITU-T H.222.0, Jun. 2012, 228 pages.

Bross et al., "Versatile Video Coding (Draft 4)", Joint Video Experts Team (JVET) of ITU-T SG 16 WP 3 and ISO/IEC JTC 1/SC 29/WG 11, Document JVET-M1001-v7, 13th Meeting: Marrakech, Morocco, Jan. 9, 2019, 300 pages.

Sullivan et al., "JVET Ad hoc group report: Project management", Joint Video Experts Team (JVET) of ITU-T SG 16 WP3 and ISO/IEC JTC 1/SC 29/WG 11, Document: JVET-M0001-v1, 13th Meeting: Marrakech, Morrocco, Jan. 9, 2019, 3 pages.

Bross et al., "Versatile Video Coding (Draft 5)", Video Experts Team (JVET) of ITU-T SG 16 WP 3 and ISO/IEC JTC 1/SC 29/WG 11, Document: JVET-N1001-v9, 14th Meeting: Geneva, Switzerland, Mar. 19, 2019, 405 pages.

Anonymous, "Advanced Video Coding for Generic Audiovisual Services", International Telecommunication Union, ITU-T Telecommunication Standardization Sector of ITU, Series H: Audiovisual and Multimedia Systems—Infrastructure of audiovisual services—Coding of moving video, Recommendation H.264, Mar. 2005, 343 pages.

Lu et al., "AHG16: Simplification of Reshaper Implementation", Joint Video Experts Team (JVET) of ITU-T SG 16 WP 3 and ISO/IEC JTC 1/SC 29/WG 11, Document: JVET-N0220, 14th Meeting: Geneva, Switzerland, Mar. 19, 2019, 9 pages.

Chen et al., Algorithm Description for Versatile Video Coding and Test Model 4 (VTM 4), JVET-M1002-V2, Editors, Joint Video Experts Team (JVET) of ITU-T SG 16 WP 3 and ISO/IEC JTC 1/SC 29/WG 11, 13th Meeting: Marrakech, MA, Jan. 9-18, 2019, 62 pages.

* cited by examiner

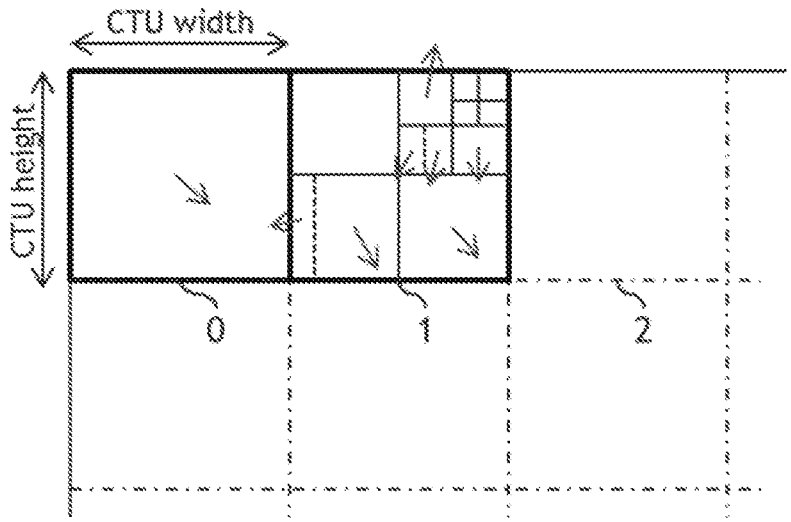
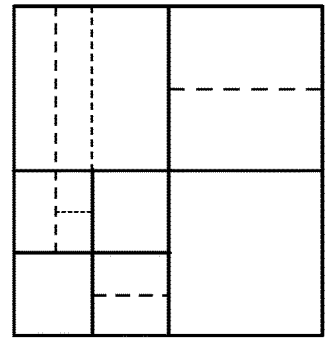
Figure 1
Figure 3
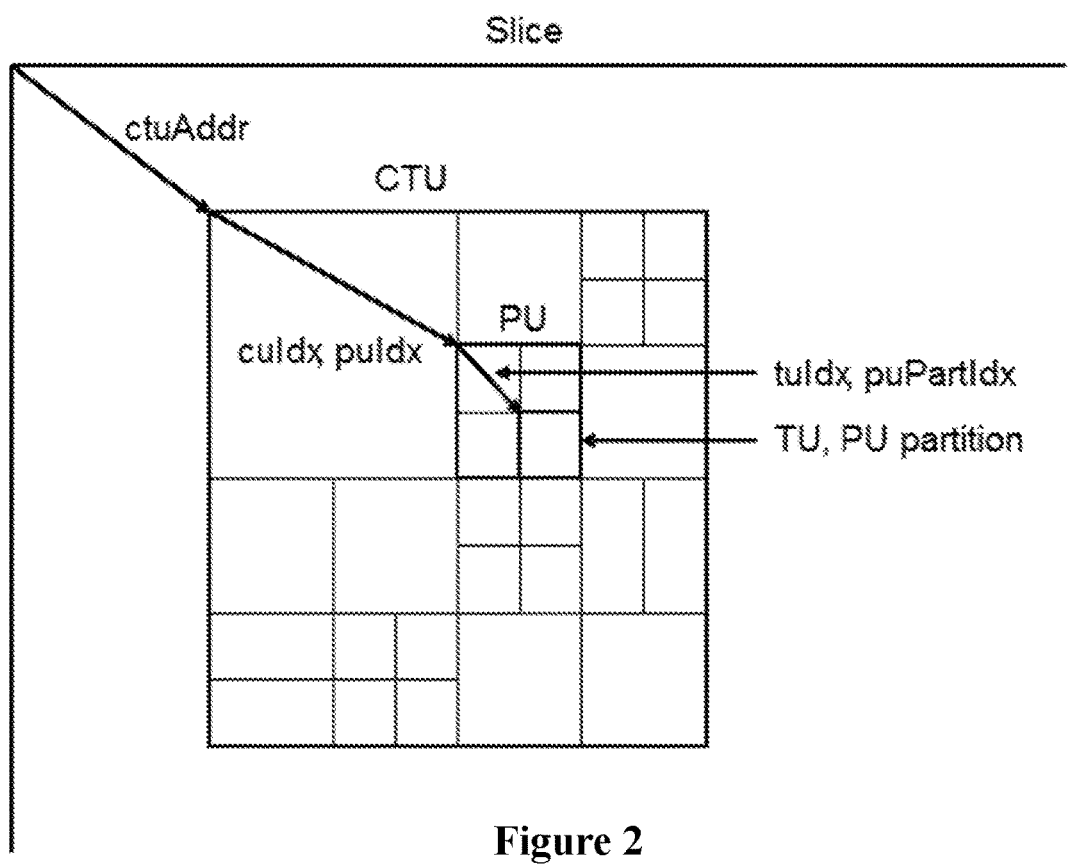
Figure 2

METHOD AND DEVICE FOR PICTURE ENCODING AND DECODING

This application is a U.S. National Stage Application under 35 U.S.C. § 371 of International Patent Application No. PCT/US2020/019626, filed Feb. 25, 2020.

This application claims the benefit of European Patent Application Nos. 19305236.2, filed Feb. 28, 2019; 19305281.8, filed Mar. 11, 2019; 19305326.1, filed Mar. 18, 2019; 19305373.3, filed Mar. 25, 2019; 19305465.7, filed Apr. 10, 2019; 19305591.0, filed May 9, 2019; 19305633.0, filed May 17, 2019; 19305684.3, filed May 29, 2019; and 19305904.5, filed Jul. 2, 2019.

1. TECHNICAL FIELD

At least one of the present embodiments generally relates to a method and a device for picture encoding and decoding, and more particularly, to a method and a device for picture encoding and decoding with independent luma and chroma partitioning.

2. BACKGROUND ART

To achieve high compression efficiency, image and video coding schemes usually employ prediction and transform to leverage spatial and temporal redundancy in the video content. Generally, intra or inter prediction is used to exploit the intra or inter frame correlation, then the differences between the original image block and the predicted image block, often denoted as prediction errors or prediction residuals, are transformed, quantized and entropy coded. During encoding the original image block is usually partitioned/split into sub-blocks possibly using quad-tree partitioning. To reconstruct the video, the compressed data is decoded by inverse processes corresponding to the prediction, transform, quantization and entropy coding.

3. BRIEF SUMMARY

According to a general aspect of at least one embodiment, a method for decoding video data is presented, comprising:
enabling a cross-component dependent tool to be used for a chroma block of a picture responsive to a size of said chroma block and to a size of at least one luma block co-located with the chroma block;
decoding said chroma block responsive to said enablement of said cross-component dependent tool.

According to a general aspect of at least one embodiment, an apparatus for decoding video data is presented, comprising one or more processors configured to perform:
enabling a cross-component dependent tool to be used for a chroma block of a picture responsive to a size of said chroma block and to a size of at least one luma block co-located with the chroma block; and
decoding said chroma block responsive to said enablement of said cross-component dependent tool.

According to another general aspect of at least one embodiment, a bitstream is formatted to include signal generated according to the encoding methods described above.

According to a general aspect of at least one embodiment, a method for encoding video data is presented, comprising:
enabling a cross-component dependent tool to be used for a chroma block of a picture responsive to a size of said chroma block and to a size of at least one luma block co-located with the chroma block;
encoding said chroma block responsive to said enablement of said cross-component dependent tool.

According to a general aspect of at least one embodiment, an apparatus for encoding video data is presented, comprising one or more processors configured to perform:
enabling a cross-component dependent tool to be used for a chroma block of a picture responsive to a size of said chroma block and to a size of at least one luma block co-located with the chroma block; and
encoding said chroma block responsive to said enablement of said cross-component dependent tool.

According to another general aspect of at least one embodiment, a bitstream is formatted to include signal generated according to the encoding methods described above.

According to another general aspect, the method for decoding or encoding video or the apparatus for decoding or encoding video further comprises determining the position in the picture of a given sample position in the chroma block, determining a co-located luma block being a luma block comprising the luma sample co-located with the position in the chroma block, determining neighboring luma samples of the co-located luma block, determining a luma value from the determined neighboring luma samples, determining a scaling factor based on the determined luma value, and applying a scaling of the chroma block residual according to the scaling factor.

One or more of the present embodiments also provide a computer readable storage medium having stored thereon instructions for encoding or decoding video data according to at least part of any of the methods described above. One or more embodiments also provide a computer readable storage medium having stored thereon a bitstream generated according to the encoding methods described above. One or more embodiments also provide a method and apparatus for transmitting or receiving the bitstream generated according to the encoding methods described above. One or more embodiments also provide a computer program product including instructions for performing at least part of any of the methods described above.

4. BRIEF SUMMARY OF THE DRAWINGS

FIG. 1 depicts a Coding Tree Unit (CTU);

FIG. 2 depicts a Coding Tree Unit divided into Coding Units, Prediction Units and Transform Units;

FIGS. 3 and 4 depict a CTU divided into Coding Units using Quad-Tree Plus Binary-Tree (QTBT);

Figure 9:
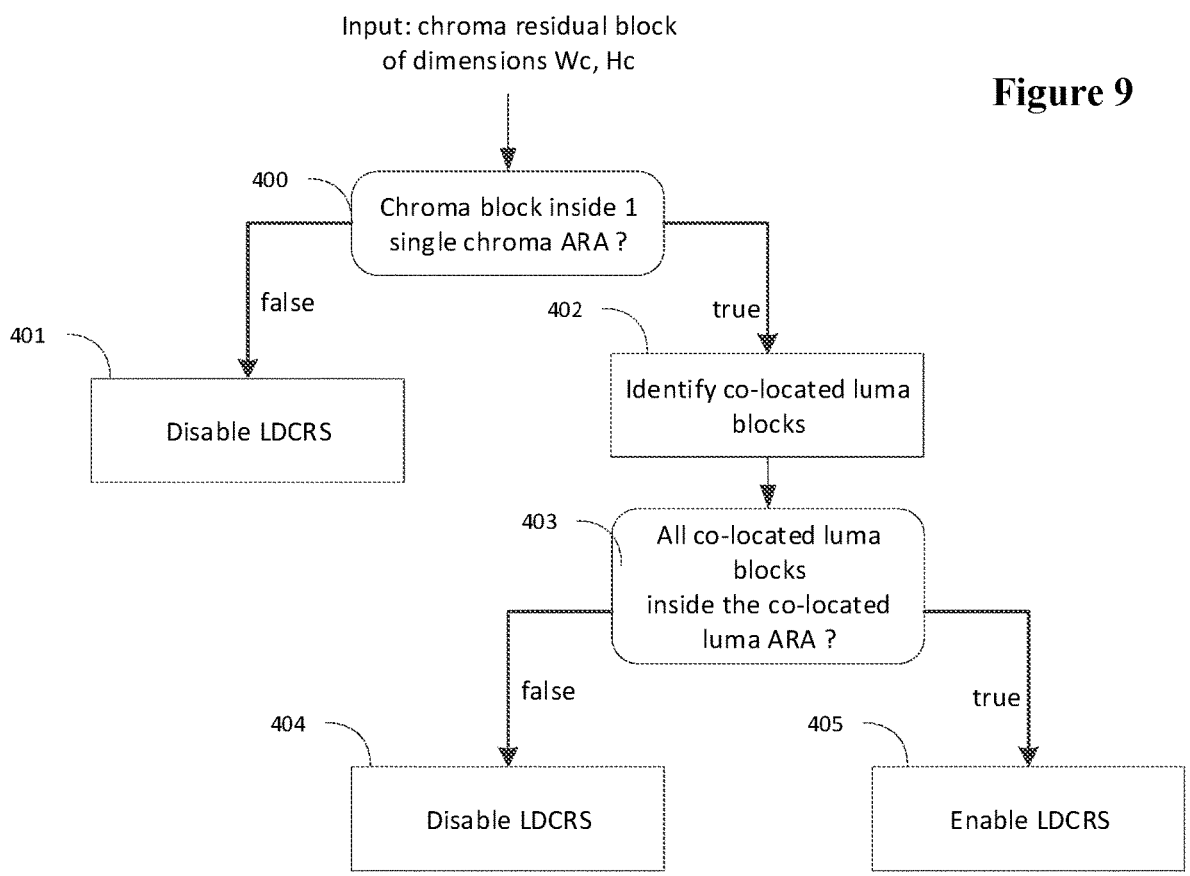
FIG. 9 depicts a flowchart of a method for enabling or disabling a cross-component dependent coding tool according to one embodiment.
Figure 11:
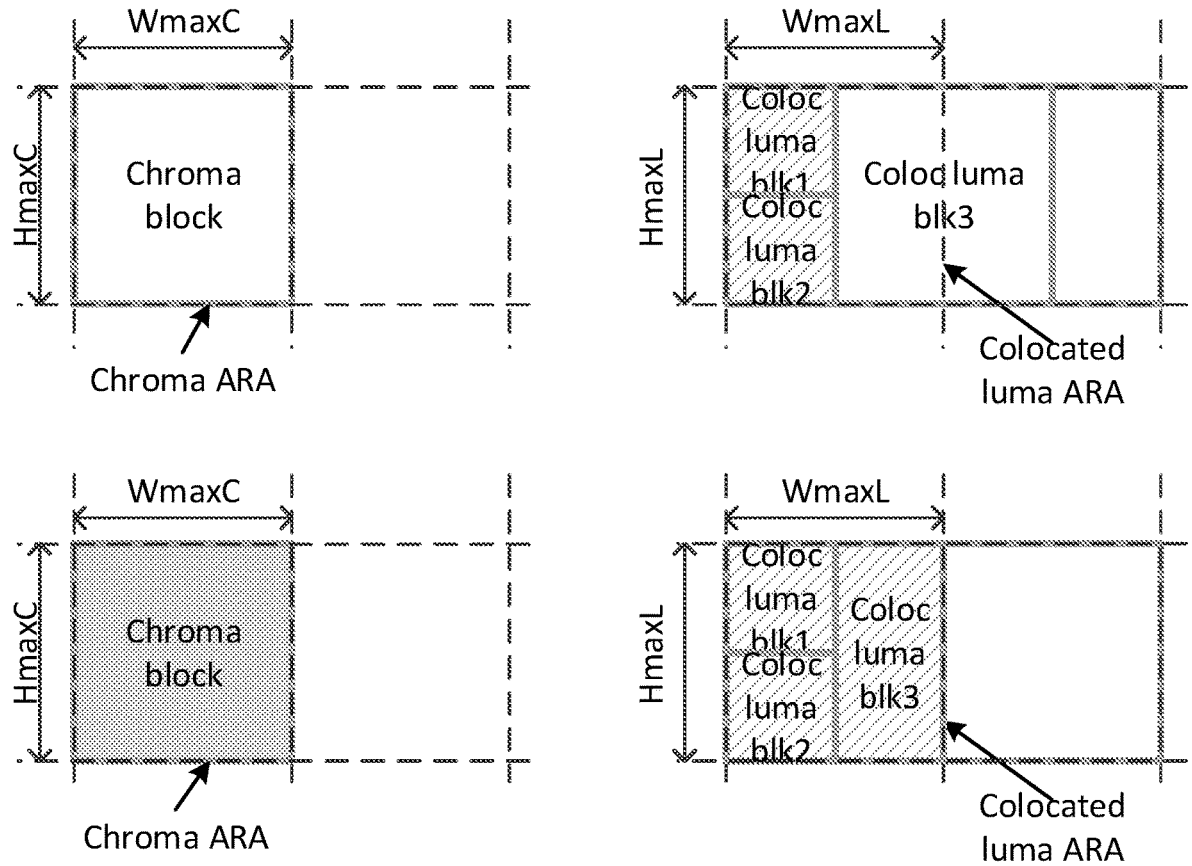
Figure 11A:
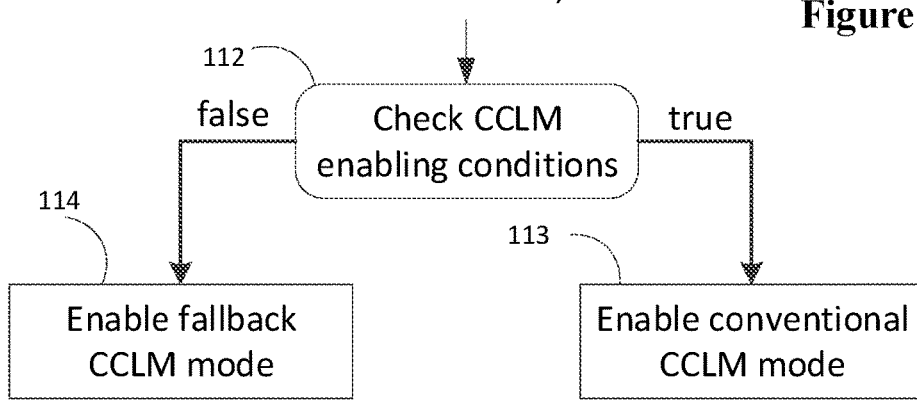
Figure 12:
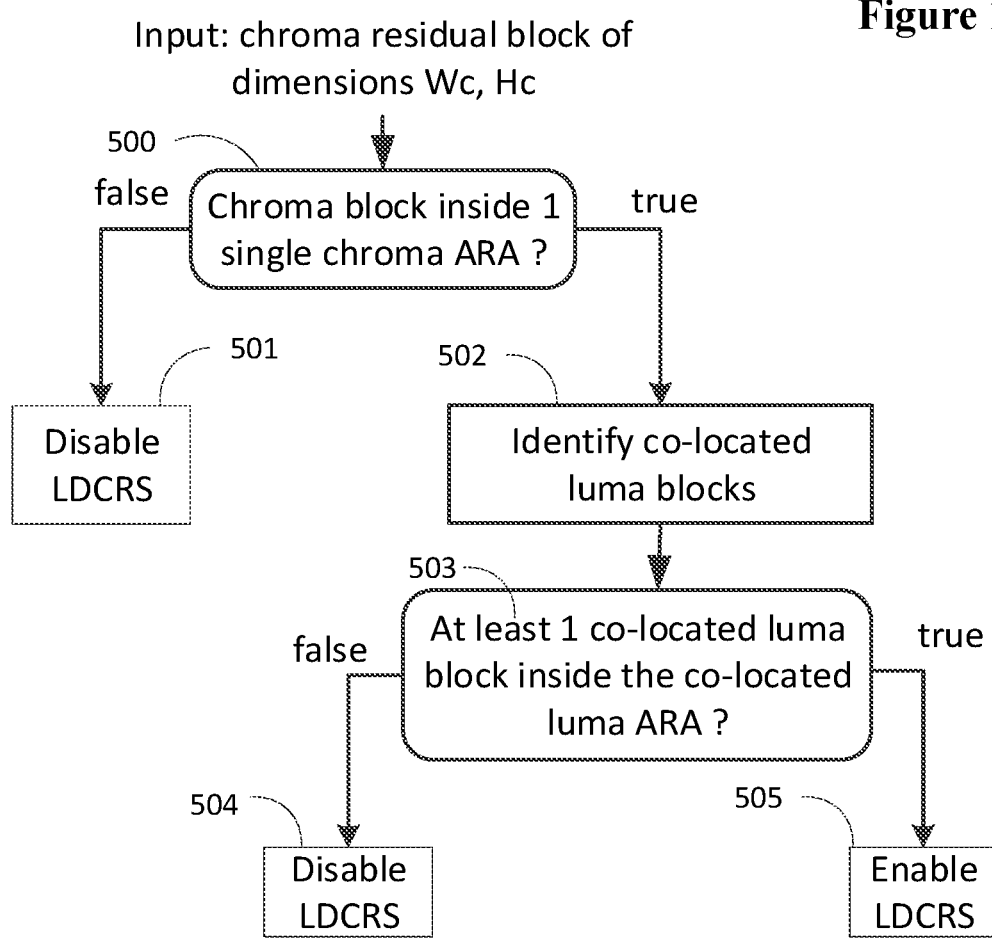
Figure 13:
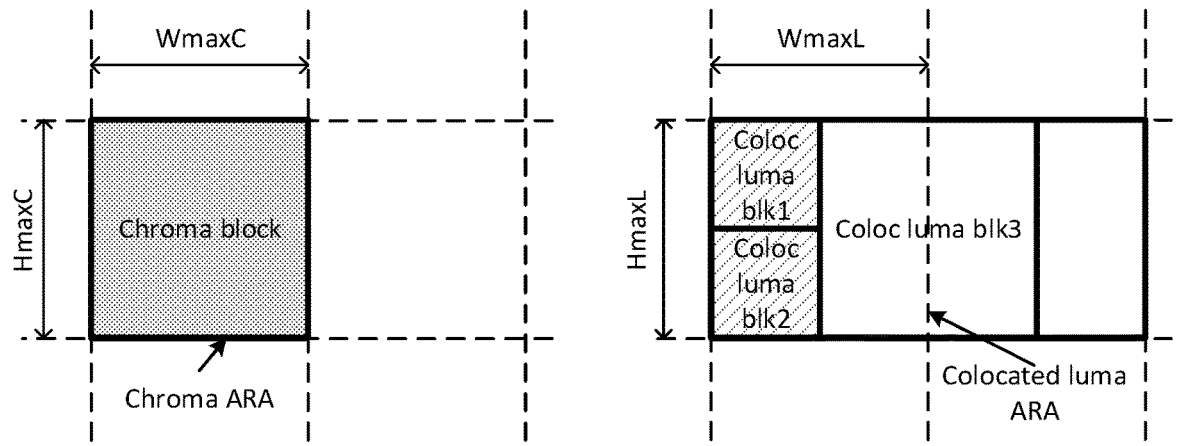
Figure 14:
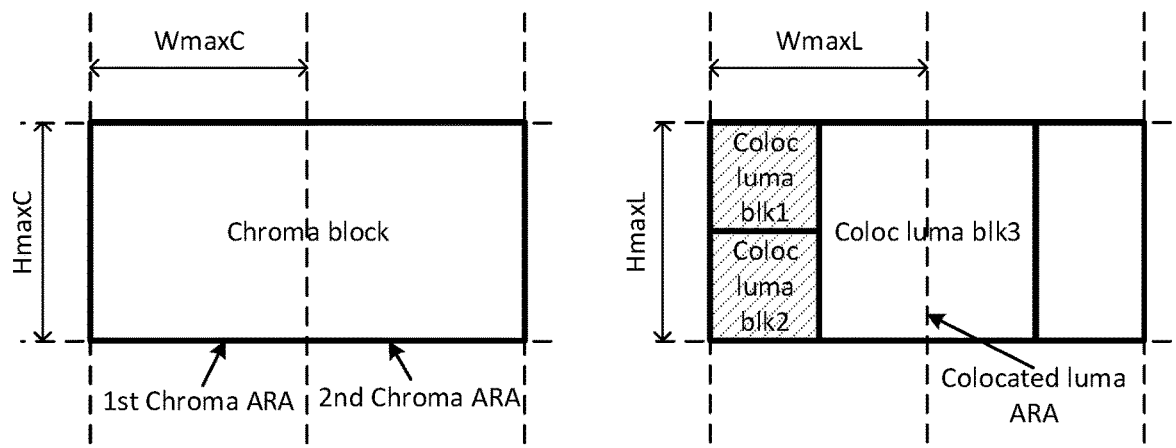
Figure 16:
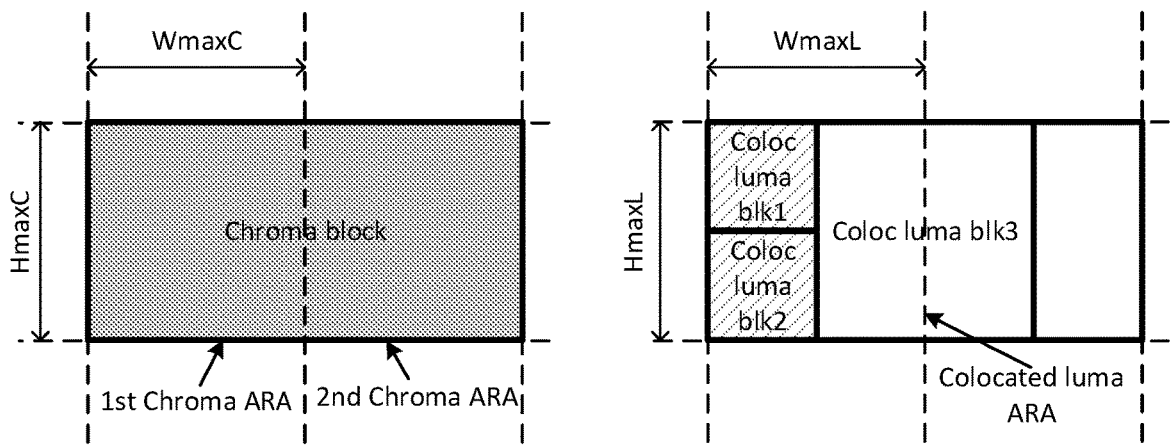
Figure 15:
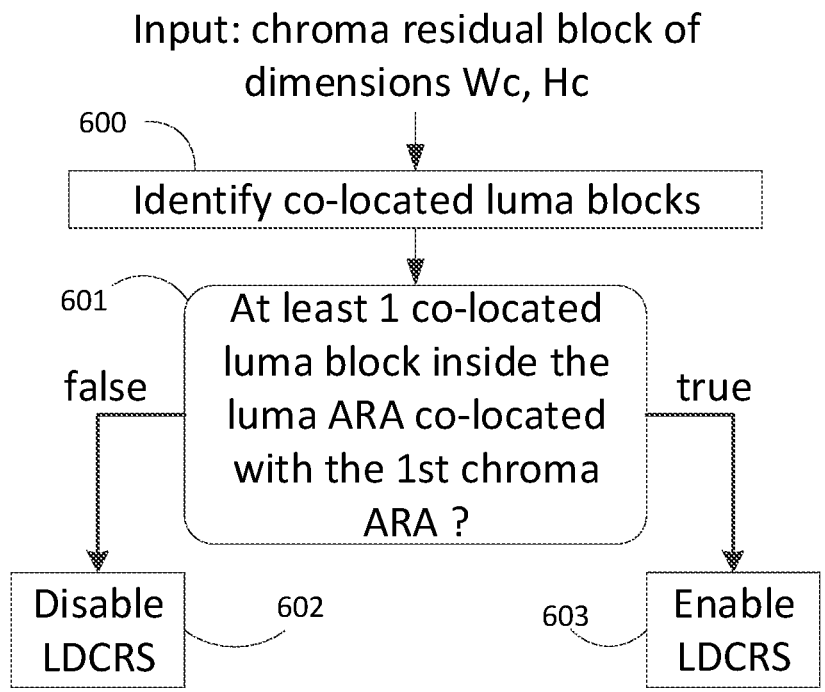
Figure 17:
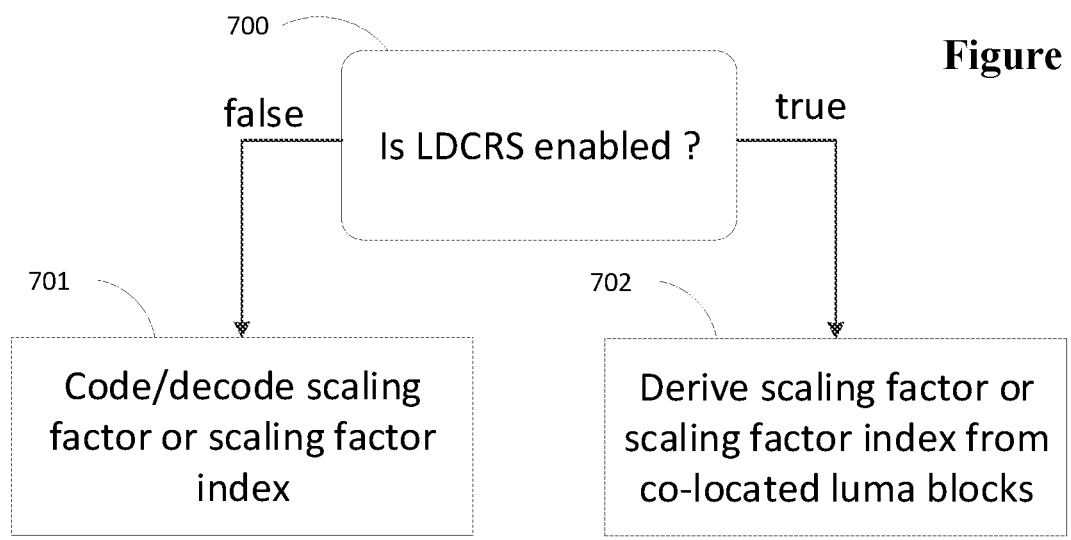
Figure 18:
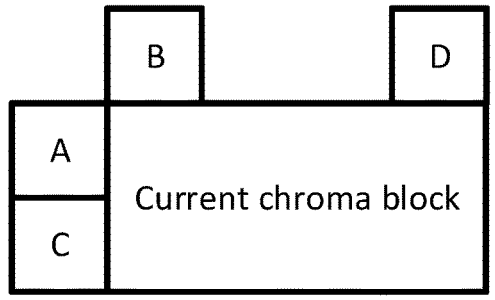
Figure 19:
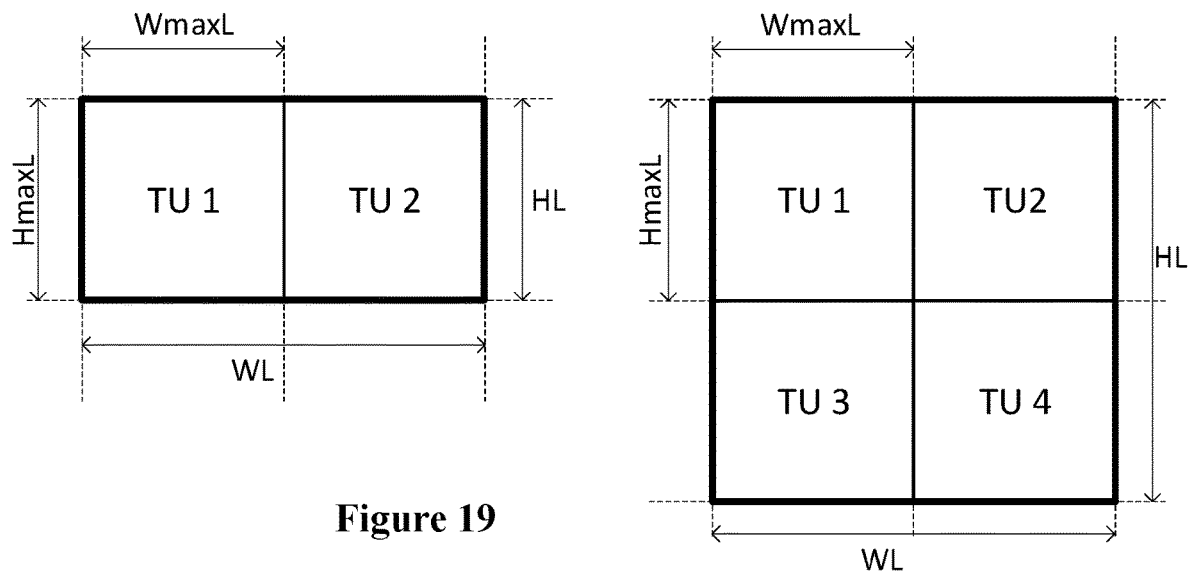
Figure 20:
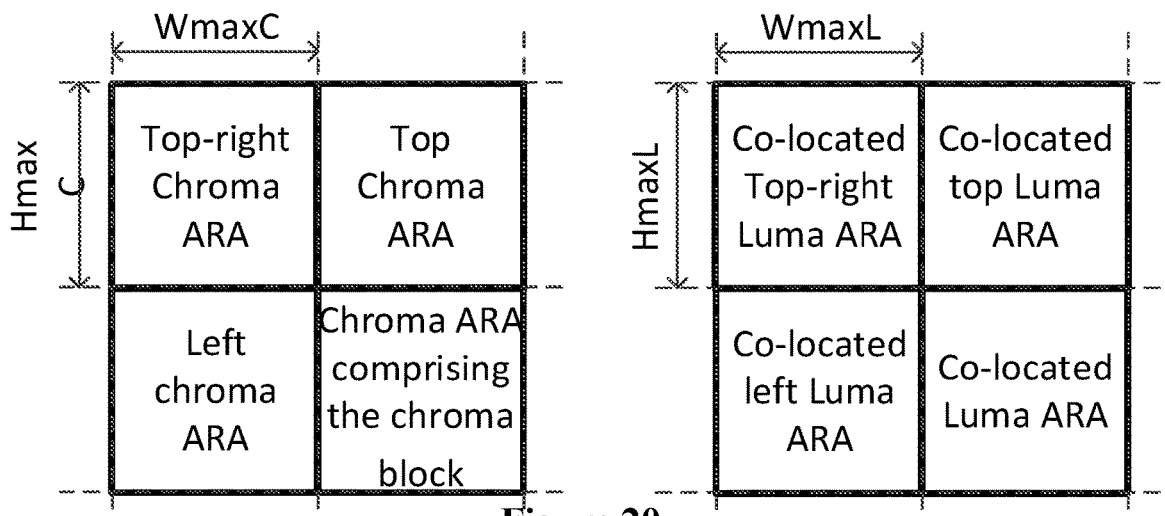
Figure 21:
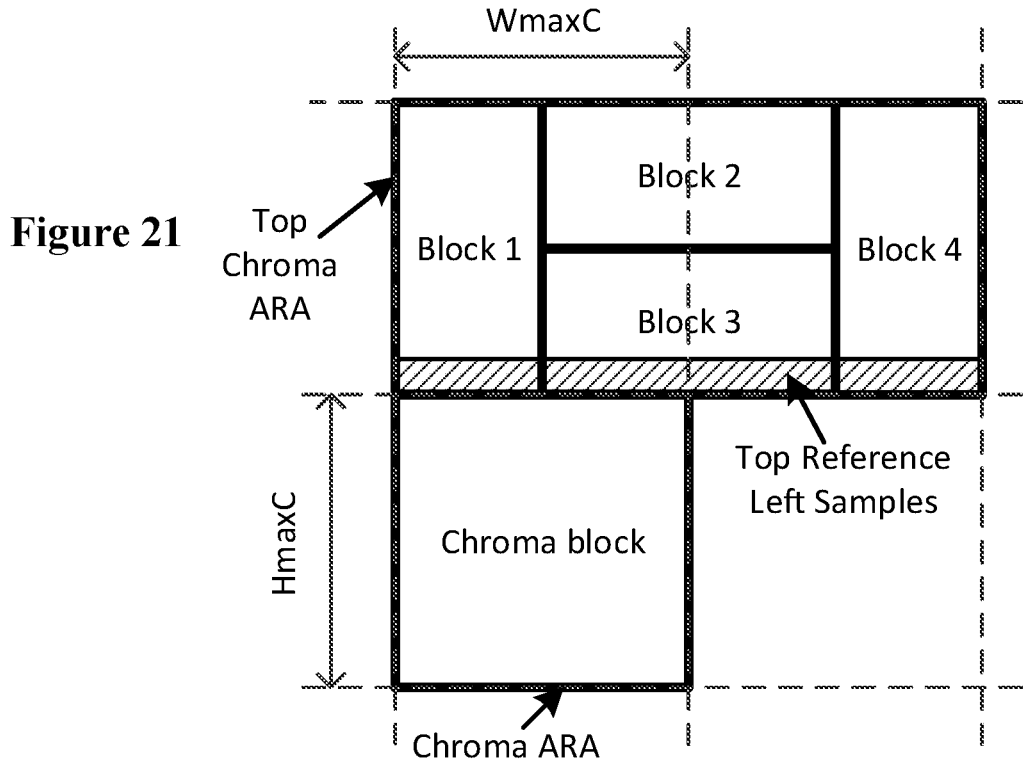
Figure 22:
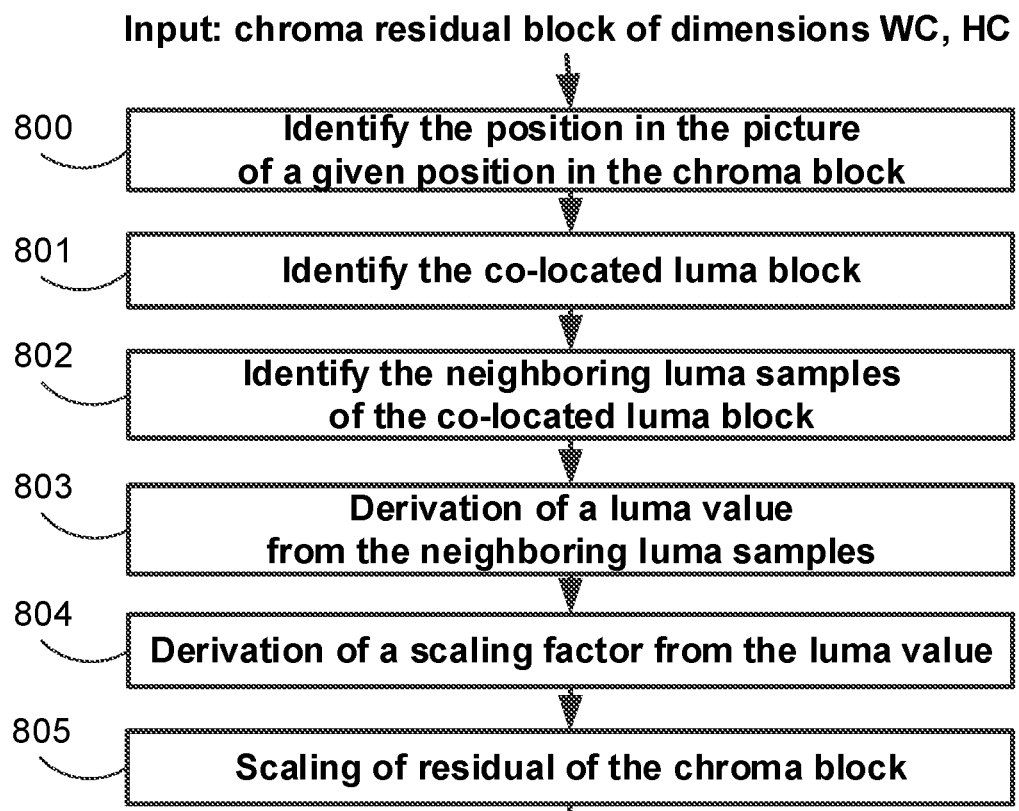
Figure 24A:
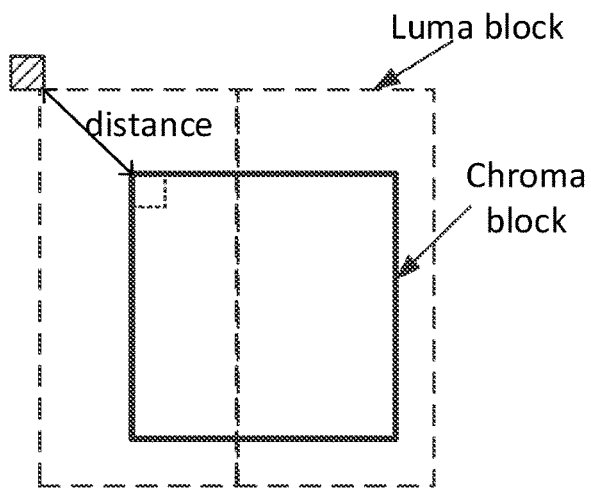
Figure 24B:
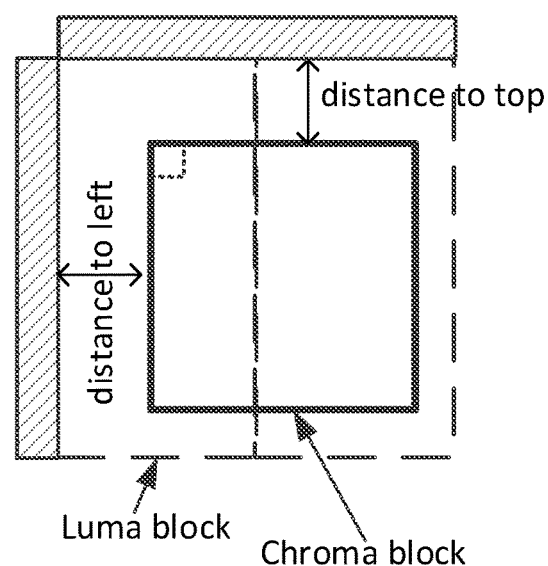
Figure 25A:
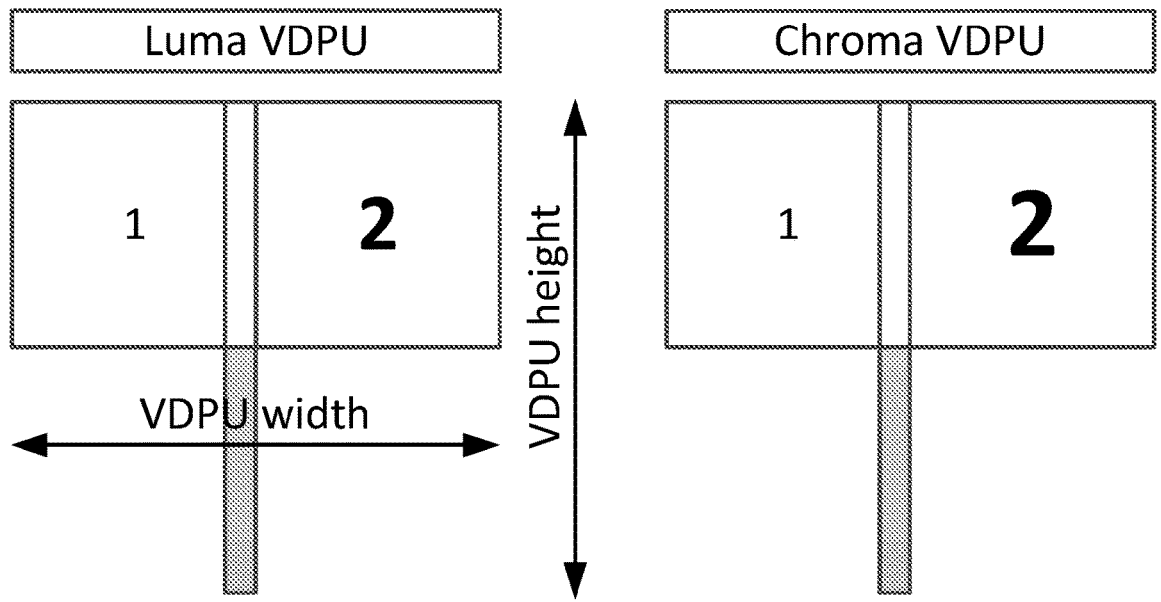
Figure 25:
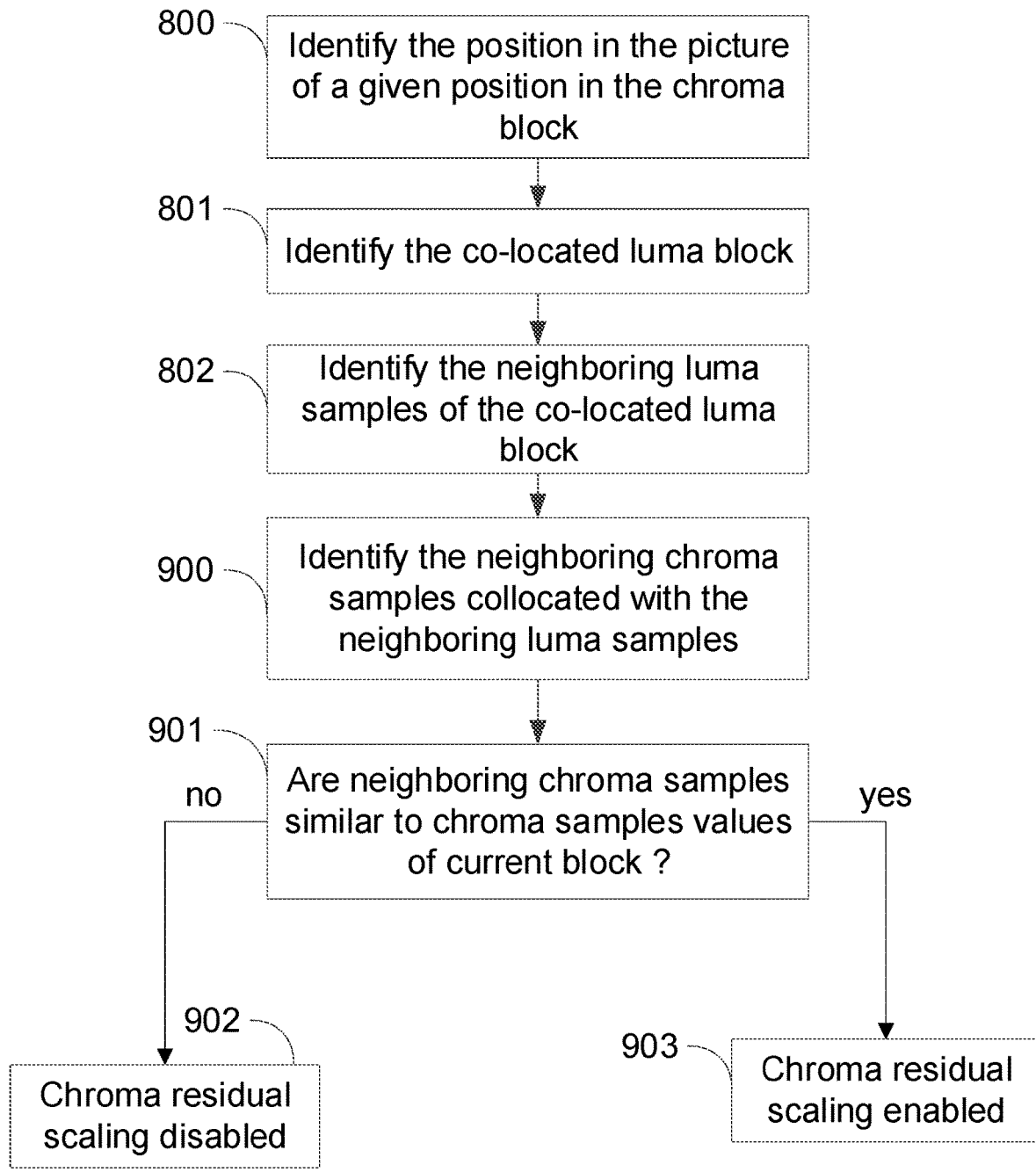
Figure 26:
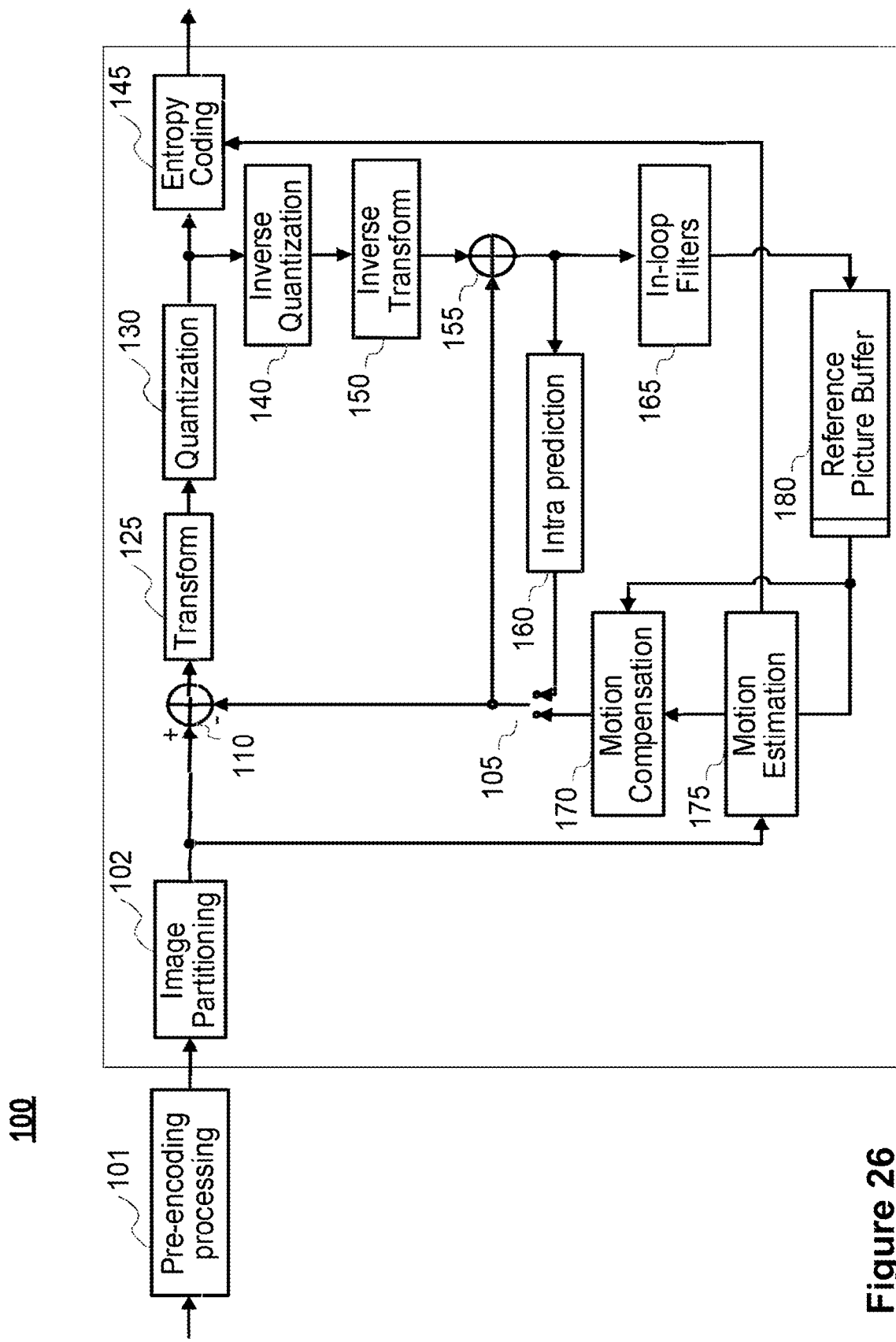
Figure 27:
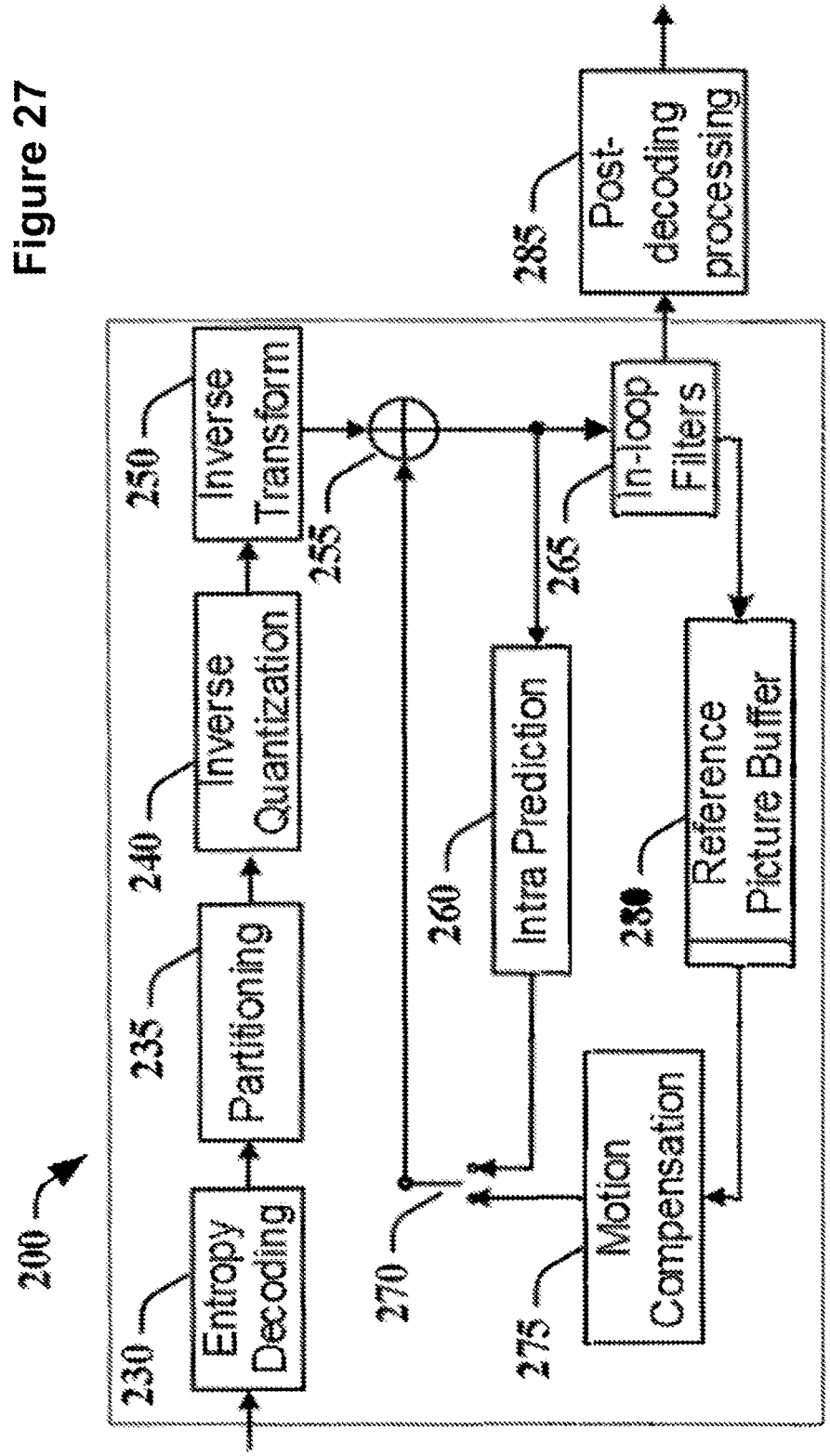
Figure 28:
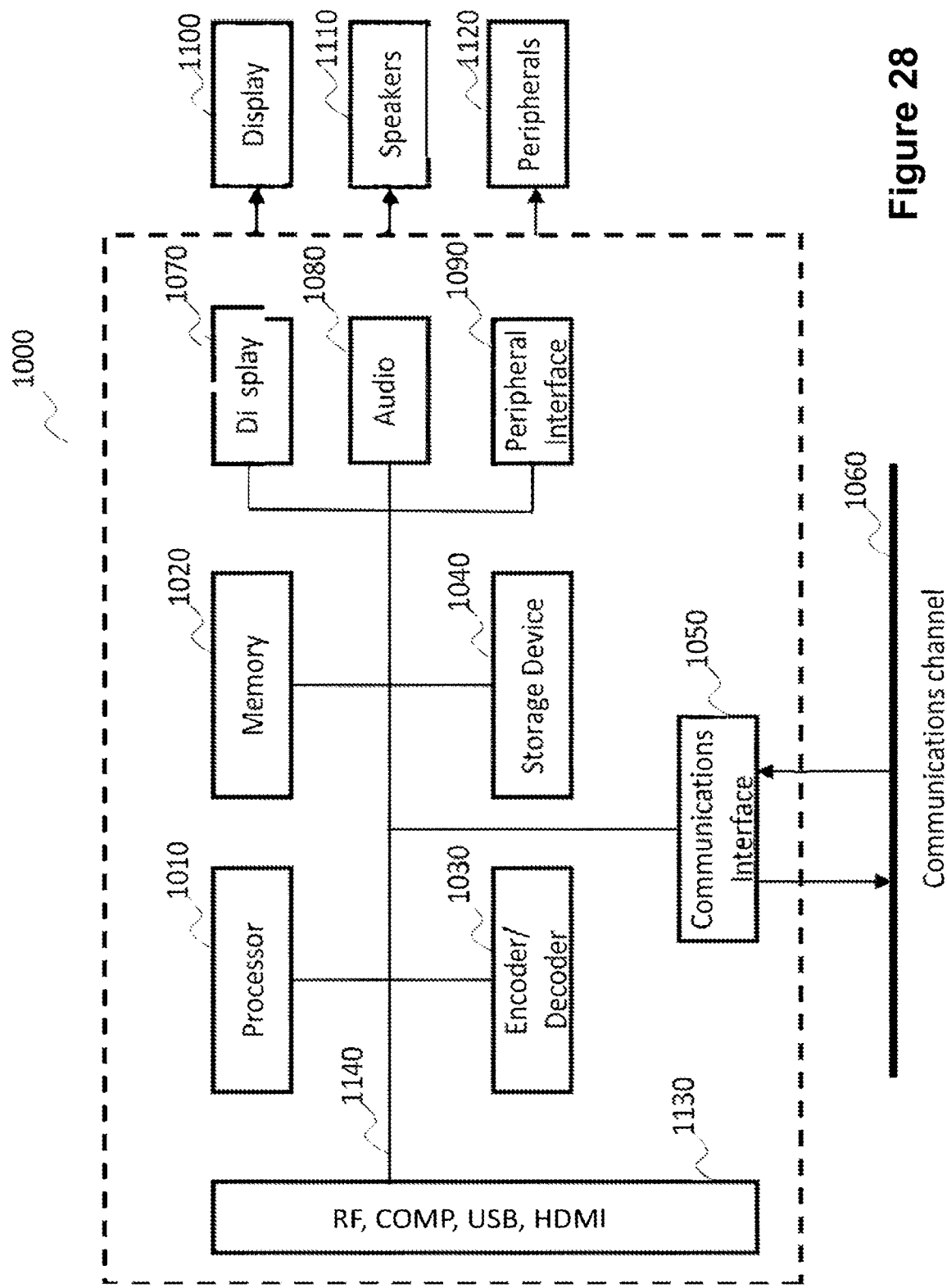

FIGS. 11, 11A, 11 B, 11C, 11 D, 11 E, 11 F and 11G illustrate the principle of enabling/disabling a cross-component dependent coding tool according to the embodiment of FIG. 9;

FIG. 12 depicts a flowchart of a method for enabling or disabling a cross-component dependent coding tool according to one embodiment;

FIGS. 13 and 14 illustrate the principle of enabling/disabling a cross-component dependent coding tool according to the embodiment of FIG. 12;

FIG. 15 depicts a flowchart of a method for enabling or disabling a cross-component dependent coding tool according to one embodiment;

FIG. 16 illustrates the principle of enabling/disabling a cross-component dependent coding tool according to the embodiment of FIG. 15;

FIG. 17 depicts a flowchart of a method for obtaining a scaling factor or scaling factor index for a chroma block according to one embodiment;

FIG. 18 depicts a current chroma block and some neighboring chroma blocks;

FIGS. 19, 20 and 21 illustrate the principle of enabling/disabling a cross-component dependent coding tool according to an embodiment;

FIG. 22 depicts a flowchart of a method for determining a scaling factor to be used in the chroma residual scaling according to one embodiment;

FIGS. 23A, 23B, 23C and 23D depict a chroma block and a co-located luma block;

FIGS. 24A and 24B illustrate examples of distances between a top-left neighboring luma sample and neighboring chroma samples;

FIGS. 25 and 25A depict a flowchart of a method for checking luma sample availability based on its collocated chroma samples and on chroma samples of the current block;

FIG. 26 illustrates a block diagram of a video encoder according to an embodiment;

FIG. 27 illustrates a block diagram of a video decoder according to an embodiment; and FIG. 28 illustrates a block diagram of an example of a system in which various aspects and embodiments are implemented.

5. DETAILED DESCRIPTION

In HEVC coding, a picture is partitioned into CTUs of square shape with a configurable size typically 64×64, 128×128, or 256×256. A CTU is the root of a quad-tree partitioning into 4 square Coding Units (CU) of equal size, i.e. half of the parent block size in width and in height as depicted on FIG. 1. A quad-tree is a tree in which a parent node can be split into four child nodes, each of which may become parent node for another split into four child nodes. In HEVC, a coding Block (CB) is partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information (e.g. Intra or Inter prediction parameters) for all color components, and a TU includes residual coding syntax structure for each color component as depicted on FIG. 2. The Intra or Inter coding mode is assigned to a CU. The size of a CB, PB and TB of the luma component applies to the corresponding CU, PU and TU.

In more recent encoding systems, a CTU is the root of a coding tree partitioning into Coding Units (CU). A coding tree is a tree in which a parent node (usually corresponding to a block) can be split into child nodes (e.g. into 2, 3 or 4 child nodes), each of which may become parent node for another split into child nodes. In addition to the quad-tree split mode, new split modes (binary tree symmetric split modes, binary tree asymmetric split modes and triple tree split modes) are also defined that increase the total number of possible split modes. The coding tree has a unique root node, e.g. a CTU. A leaf of the coding tree is a terminating node of the tree. Each node of the coding tree represents a block that may be further split into smaller blocks also named sub-blocks. Once the partitioning of a CTU into CUs is determined, CUs corresponding to the leaves of the coding tree are encoded. The partitioning of a CTU into CUs and the coding parameters used for encoding each CU (corresponding to a leaf of the coding tree) may be determined on the encoder side through a rate distortion optimization procedure.

Figure 4:
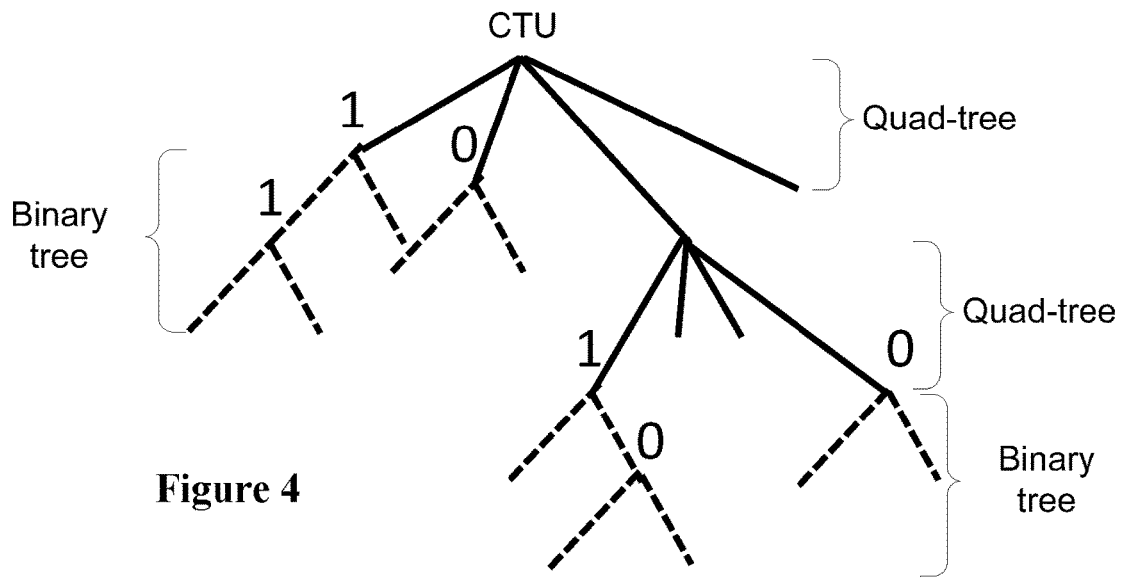
Figure 5:
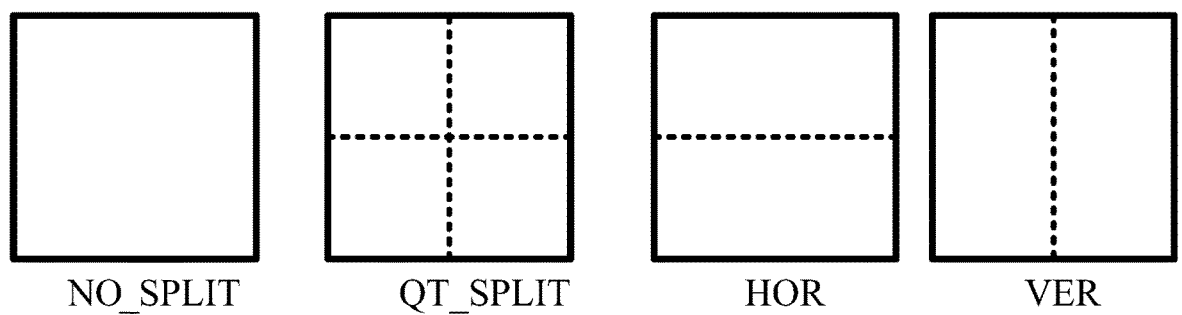
FIG. 5 illustrates the splitting modes of a coding unit as defined by the Quad-Tree plus Binary-Tree coding tool

FIG. 3 represents a partitioning of a CTU into CUs where coding units can be split both according to quad-tree and symmetric binary tree split modes. This type of splitting is known as QTBT (Quad-Tree plus Binary Tree). Symmetric binary tree split modes are defined to allow a CU to be split horizontally or vertically into two coding units of equal size. On FIG. 3 solid lines indicate quad-tree partitioning and dotted lines indicate binary splitting of a CU into symmetric CUs. FIG. 4 represents the associated coding tree. On FIG. 4, solid lines represent the quad-tree splitting and dotted lines represent the binary splitting that is spatially embedded in the quad-tree leaves. FIG. 5 depicts the 4 split modes used in FIG. 3. The mode NO_SPLIT indicates that the CU is not further split. The mode QT_SPLIT indicates that the CU is split into 4 quadrants according to a quad-tree, the quadrants being separated by two split lines. The mode HOR indicates that the CU is split horizontally into two CUs of equal size separated by one split line. VER indicates that the CU is split vertically into two CUs of equal size separated by one split line. The split lines are represented by dashed lines on FIG. 5.

With QTBT splitting, a CU has either a square or a rectangular shape. The size of a coding unit is a power of 2, and typically goes from 4 to 128 in both directions (horizontal and vertical). QTBT has several differences with HEVC's splitting.

First, QTBT splitting of a CTU is made of two stages. A CTU is first split in a quad-tree fashion. Each quad-tree leaf may then be further divided in a binary fashion. This is illustrated on the right of FIG. 3 where solid lines represent the quad-tree decomposition phase and dashed lines represent the binary decomposition that is spatially embedded in the quad-tree leaves.

Second, the Luma and Chroma block partitioning structure may be separated and decided independently, notably in intra slices.

Additional types of partitioning may also be used. Asymmetric binary tree (ABT) split modes are defined to allow a CU to be split horizontally into two coding units with respective rectangular sizes (w,h/4) and (w,3h/4) or vertically into two coding units with respective rectangular sizes (w/4,h) and (3w/4,h)) as depicted on FIG. 6. The two coding units are separated by one split line represented by a dashed line on FIG. 6.

Figure 6:
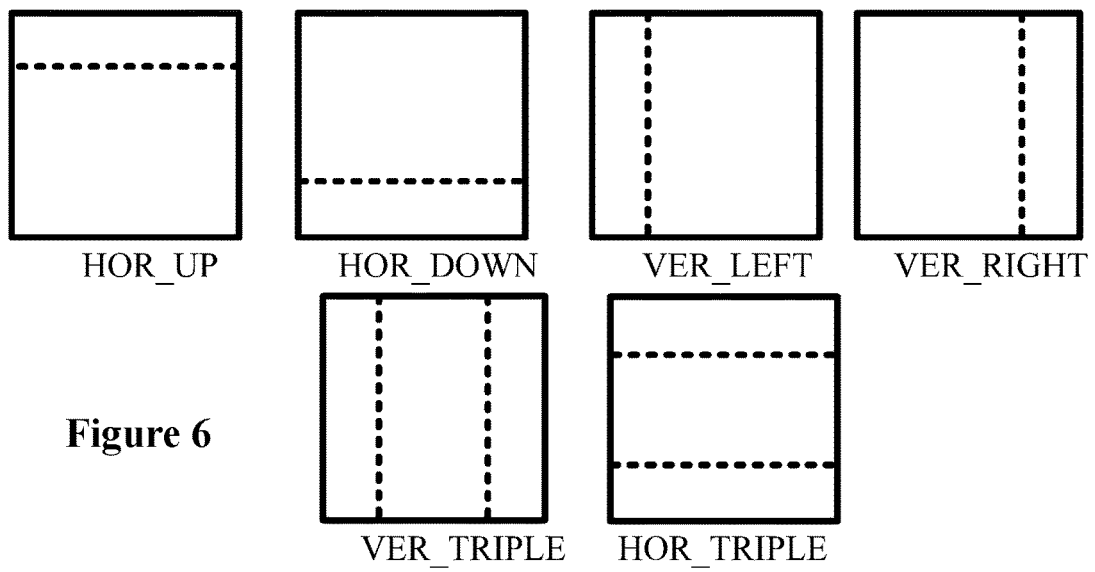
FIG. 6 illustrates additional splitting modes of a coding unit, e.g. asymmetric binary splitting modes and triple tree splitting modes.

FIG. 6 also illustrates triple tree split modes according to which a coding unit is split into three coding units in both vertical and horizontal directions. In horizontal direction, a CU is split into three coding units of respective sizes (w, h/4), (w,h/2) and (w, h/4). In vertical direction, a CU is split into three coding units of respective sizes (w/4, h), (w/2, h) and (w/4, h).

The splitting of a coding unit is decided on the encoder side through by rate distortion optimization, which comprises determining the representation of the CTU with minimal rate distortion cost.

In the present application, the term "block" or "picture block" can be used to refer to any one of a CTU, a CU, a PU, a TU, a CB, a PB and a TB. In addition, the term "block" or "picture block" can be used to refer to a macroblock, a partition and a sub-block as specified in H.264/AVC or in other video coding standards, and more generally to refer to an array of samples of numerous sizes.

In the present application, the terms "reconstructed" and "decoded" may be used interchangeably, the terms "pixel" and "sample" may be used interchangeably, the terms "image," "slice", "tile", "picture" and "frame" may be used interchangeably. Usually, but not necessarily, the term "reconstructed" is used at the encoder side while "decoded" is used at the decoder side.

Using these new topologies makes it possible to improve significantly the coding efficiency. In particular, a significant gain is obtained for the chroma components. This gain comes from the separation/independency of the Luma and Chroma coding trees (or partitioning).

However, this separation of the Luma and Chroma coding tree at the CTU level has some issues in terms of hardware implementation. A CTU is typically of size 128×128 or 256×256. Fully separating the coding trees of the Luma and Chroma components implies that these Luma and Chroma are also fully separated in the compressed domain, hence also appear in a separated way in the coded bit-stream. This causes some issue for decoder implementations, where one would like to ensure that a decoding pipeline can be achieved on a maximum decoding unit size which may be smaller than the CTU size. Typically, a 64×64 based decoder pipeline is desired for some decoder implementation. To do so, a maximum transform block size equal to 64×64 has been chosen in the Versatile Video Coding Test Model.

Combining the use of separate luma/chroma coding trees with coding tools involving an inter-dependency between the chroma and their co-located luma samples (e.g. luma-dependent chroma residual scaling) can be problematic. Indeed, in order to process a chroma block, the luma samples of the luma block co-located with the considered chroma block have to be processed prior to the chroma block. If the luma block is of large size, this may generate a high structural pipeline delay before being able to process the chroma block.

At least one embodiment applies constraint(s) on the combined use of separate luma/chroma coding trees and coding tools involving an inter-dependency between the chroma and their co-located luma samples (e.g. chroma residual scaling, Cross Component Linear Model known as CCLM) responsive to the size of at least one luma coded block co-located with the chroma coded block.

At least one embodiment enables or disables the component inter-dependent coding tool (e.g. the luma-dependent chroma residual scaling for chroma coded blocks) responsive to the size (or horizontal/vertical dimensions) of the chroma coded block and of the luma coded blocks co-located with samples of the considered chroma coded block.

At least one embodiment provides a solution for chroma blocks in the case where the chroma residual scaling is disabled due to the constraints mentioned above on the combined use of separate luma/chroma coding tree and chroma residual scaling.

Luma-dependent chroma residual scaling is an example of a coding tool involving an inter-dependency between the chroma and their co-located luma samples. Luma-dependent chroma residual scaling is disclosed in JVET-M0427 from Lu et al entitled "*CE12: Mapping functions (test CE12-1 and CE12-2)*". Luma-dependent chroma residual scaling comprises using a scaling or inverse scaling table indexed by luma values. The table is explicitly signaled in the stream or deduced from a table coded in the stream.

At the encoder side, the process works as follows. When encoding a chroma block, a luma value, representative of the co-located luma block, is computed. This is typically the average of the luma samples in the luma prediction (or reconstructed) block co-located with the considered chroma block. From the computed luma value, a scaling value is picked up from the scaling table. The scaling value is applied as a multiplicative factor to the residual of the chroma prediction, before applying the transform then quantization to the chroma residual signal.

At the decoder side, the process works as follows. When decoding a chroma block, a luma value, representative of the luma block co-located with the chroma block under consideration, is computed. This is typically the average of the luma samples in the luma prediction (or reconstructed) block co-located with the considered chroma block. From the computed luma value, an inverse scaling value is picked up from the inverse scaling table signaled in the stream or deduced from signaled data in the stream. The inverse scaling value is applied to the residual of the chroma prediction, after having applied the inverse quantization then inverse transform.

JVET-M0427 suggests disabling the chroma residual scaling in case of usage of luma/chroma separate coding tree. This solution generates coding loss to the chroma components.

In the various embodiments, the separate luma/chroma tree partitioning is enabled, i.e. luma and chroma partitioning can be achieved independently. The proposed embodiments improve the coding efficiency, especially for the chroma components.

In the following, the chroma format is considered to be 4:2:0, i.e. the dimensions of the chroma components are half the dimensions of the luma component. It will be appreciated, however, that the present embodiments are not restricted to this specific chroma format. Other chroma formats may be used by modifying the ratio between the luma dimensions and the chroma dimensions.

For sake of simplification and readability, in the following figures, the same resolution is depicted for the luma and chroma components, even if the actual resolutions are different, such as for instance in case of 4:2:0 chroma format. In such a case, a simple scaling should be applied to the chroma pictures.

Maximum horizontal/vertical dimensions Wmax/Hmax are specified that constrain the use of the luma-dependent chroma residual scaling for a given coded chroma block, in the case where the separate luma/chroma tree partitioning is enabled. The picture is divided in non-overlapping rectangular areas of size Wmax/Hmax for luma, WmaxC/HmaxC for chroma (typically Wmax=Hmax=32 for luma, or for chroma WmaxC=HmaxC=16), named below "authorized rectangular areas" (ARAs). In multiple variant embodiments, the Luma-Dependent chroma Residual Scaling (noted LDCRS in the following) activation is conditioned to the position and size of the chroma block and of the luma blocks co-located with the chroma block related to the ARAs grid.

Figure 10:
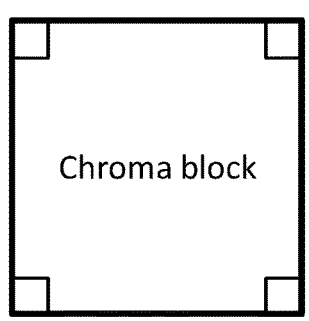
FIG. 10 illustrates a chroma block and its co-located luma blocks according to an example.
Figure 10:
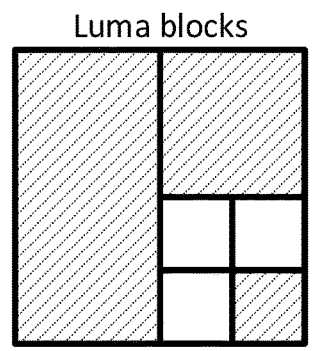

The various embodiments refer to luma blocks co-located with the considered chroma block. Luma blocks co-located with a chroma block may be defined as:
the luma block contains a pixel co-located with a given position in the chroma block, such as
the center of the chroma block, e.g. defined as relative position $((x0+Wc)/2,(y0+Hc)/2)$ in the chroma block, where $(x0,y0)$ corresponds to the relative position in the chroma picture of the top-left sample of the chroma block, and $(Wc,Hc)$ are the horizontal/vertical dimensions of the chroma block
the top left position in the chroma block, defined as relative position $(x0,y0)$ in the chroma picture
the bottom right position in the chroma block, defined as relative position $(x0+Wc-1,y0+Hc-1)$ in the chroma picture
the top right position in the chroma block, defined as relative position $(x0+Wc-1,y0)$ in the chroma picture
the bottom left location in the chroma block, defined as relative position $(x0,y0+Hc-1)$ in the chroma picture
the luma blocks co-located with several given positions in the chroma block, such as the ones mentioned above; for instance, the luma blocks co-located with the 4 chroma block positions top left, top right, bottom left, bottom right are considered (see FIG. 10); or
the luma blocks co-located with all the chroma samples positions of the considered chroma block Embodiment 1—LDCRS Disabled in the Case where the Chroma Block Crosses ARAs Borders In at least one embodiment, if the considered chroma block is not entirely contained in a single chroma ARA, LDCRS is disabled. This corresponds to the following equations:

If$((x0/W\text{max}C)!=((x0+Wc-1)/W\text{max}C)\|((y0/H\text{max}C)$
$!=((y0+Hc-1)/H\text{max}C))$, LDCRS is disabled.

where x∥y is a boolean logical "or" of x and y and "!=" means "Not equal to".

Figure 7:
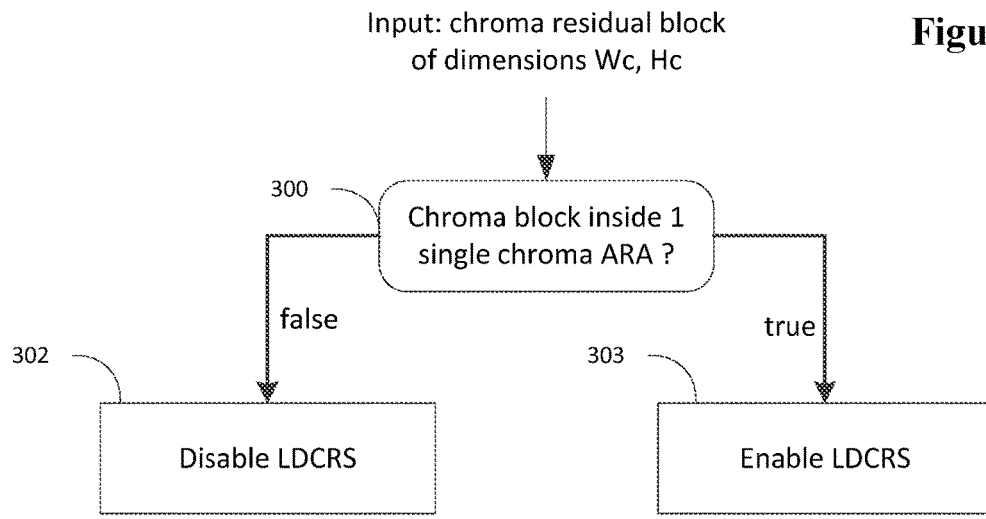
FIG. 7 depicts a flowchart of a method for enabling or disabling a cross-component dependent coding tool according to one embodiment.

A simplified block diagram of the process is shown in FIG. 7. Step 300 checks if the chroma block is inside one single chroma ARA. If this condition is true, LDCRS is enabled (step 303). If this condition is false, LDCRS is disabled (step 302).

FIG. 8A, 8B, 8C, 8D illustrate some cases of chroma partitioning, with grey blocks corresponding to chroma blocks where LDCRS is enabled, and white blocks corresponding to chroma blocks where LDCRS is disabled. Chroma blocks are delineated by bold black lines. The grid defined by WmaxC and HmaxC is indicated with dashed lines.

Figure 8A:
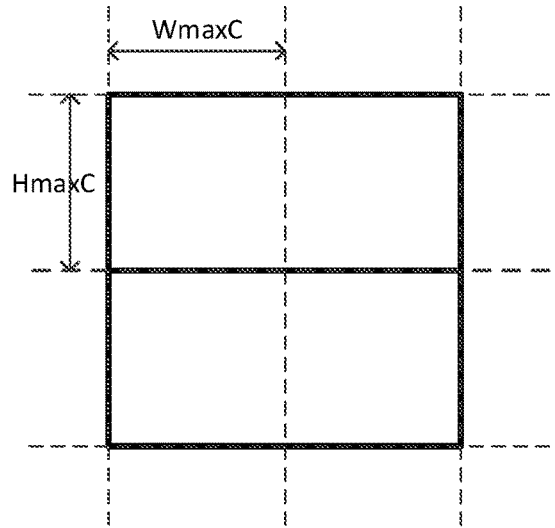
FIG. 8A, 8B, 8C, 8D illustrate the principle of enabling/disabling a cross-component dependent coding tool according to the embodiment of FIG. 7.
Figure 8B:
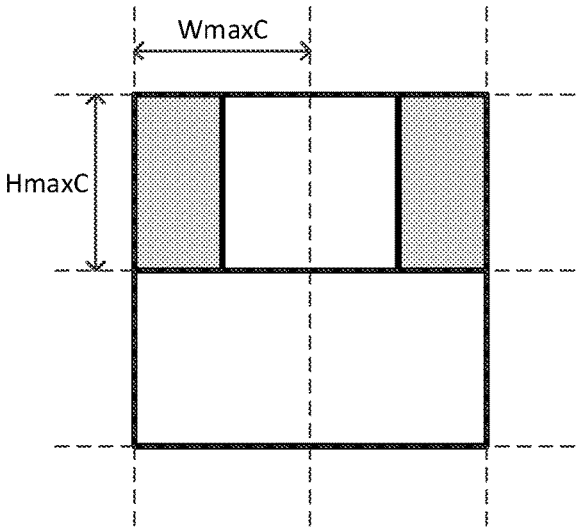
Figure 8C:
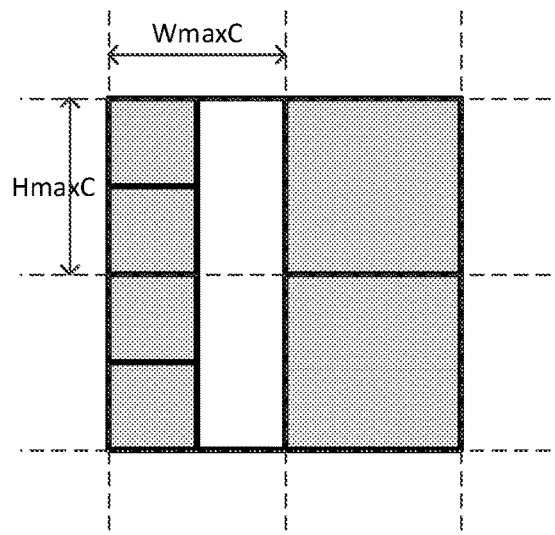
Figure 8D:
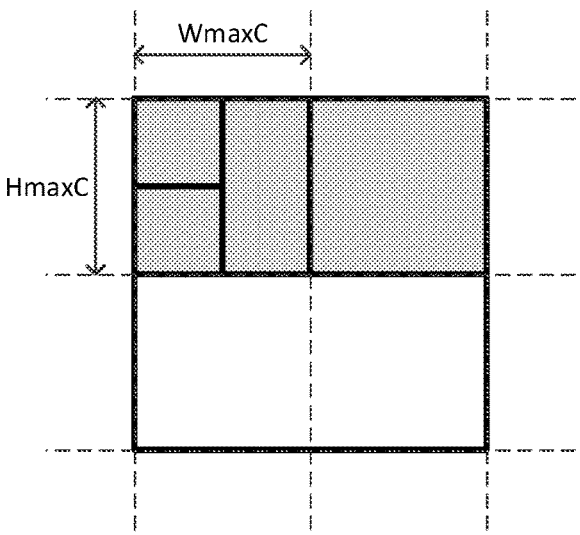

In FIG. 8A, the 2 chroma blocks cross several chroma ARAs; according to the current embodiment, LDCRS is disabled for both chroma blocks.
In FIG. 8B, 2 chroma blocks are inside one chroma ARA; according to the current embodiment, LDCRS is enabled for both chroma blocks.
In FIG. 8C, 1 rectangular vertical chroma block crosses two chroma ARAs; according to the current embodiment, LDCRS is disabled for this chroma block. All the other chroma blocks are inside one chroma ARA, and therefore LDCRS can be enabled for those chroma blocks.
In FIG. 8D, one horizontal chroma block crosses two chroma ARAs; according to the current embodiment, LDCRS is disabled for this chroma block. All the other chroma blocks are inside one chroma ARA, and therefore LDCRS can be enabled for those chroma blocks.

Embodiment 2—LDCRS Disabled in the Case where the Chroma Block Crosses Chroma ARAs Borders or in the Case where at Least One of the Co-Located Luma Blocks Crosses the Co-Located Luma ARA Borders In an embodiment, LDCRS is disabled in the case where at least one of the following conditions is true:
the considered chroma block is not entirely contained in a single chroma ARA
at least one of the luma blocks co-located with the considered chroma block is not entirely contained in the luma ARA co-located with the chroma ARA, i.e. crosses the co-located luma ARA borders.

A simplified block diagram of the process is shown in FIG. 9. Step 400 checks if the chroma block is inside one single chroma ARA. If this condition is false, LDCRS is disabled (step 401). If this condition is true, the luma blocks co-located with the considered chroma block are identified (step 402). Step 403 checks if all the co-located luma blocks are inside the luma ARA co-located with the chroma ARA. If this condition is false, LDCRS is disabled (step 404). If this condition is true, LDCRS is enabled (step 405).

FIG. 11 provides two examples of the current embodiment. In the top of the figure, the chroma block is contained inside a single chroma ARA (top left), and has 3 co-located luma blocks (coloc luma blocks 1, 2 and 3, top right). Two of them (coloc luma blocks 1 and 2, in dashed blocks) are inside the co-located luma ARA, while a third one (coloc luma block 3) is outside the co-located luma ARA. Because this third luma block is outside the co-located luma ARA, LDCRS is disabled according to the current embodiment.

In the bottom of the figure, the chroma block is contained inside a single chroma ARA, and has 3 co-located luma blocks (coloc luma blocks 1, 2 and 3). The three of them are inside the co-located luma ARA. LDCRS is enabled according to the current embodiment.

The current VVC specification supports three type of splitting: Quad Tree (QT), Binary Tree (BT, Horizontal or Vertical) and Ternary Tree (TT, Horizontal or Vertical), as illustrated in the FIGS. 5 and 6. In a variant, the BT and TT splits are enabled from a given ARA dimension (e.g. 32×32 for luma, 16×16 from chroma when 4:2:0 chroma format is considered). Above this dimension, only QT split, or no split, are enabled. Hence, the conditions presented in embodiments 1 and 2 are systematically satisfied, except for the case "No split" of blocks larger than the luma ARA/chroma ARA dimensions (e.g. for a luma block 64×64 not split into 4 blocks 32×32).

In at least one embodiment, BT and TT splits are only enabled for luma block sizes lower than or equal to 32×32 or chroma blocks sizes lower than or equal to 16×16 (when 4:2:0 chroma format is used). Above this size, only QT split (or no split) is enabled. The restriction concerns either the mode LDCRS or the mode CCLM. The process is illustrated in FIG. 11C, considering a luma ARA of size 32×32 and a chroma ARA of size 16×16. In step 1300, it is checked if the considered block is a luma block of size greater than or equal to 64×64 or a chroma block of size greater than or equal to 32×32. If this test is true, step 1301 disables BT and TT split, while enabling no split and QT split. If this test is false, step 1302 enables no split, QT, BT and TT split.

In at least one embodiment, to reduce the latency of processing chroma in case of mode LDCRS or CCLM, when a square luma block larger than the luma ARA is not split, the corresponding chroma block can only be split into 4 blocks by QT split that can possibly be further split, or not split at all. For example, considering a luma ARA of size 32×32 and a chroma ARA of size 16×16, when a square luma block of size 64×64 is not split, the corresponding chroma block (of size 32×32 in 4:2:0 format) can only be split into 4 16×16 blocks by QT split that can possibly be further split (dotted line in the figure), or not split at all. Cases following those restrictions are shown in FIG. 11D.

In at least one embodiment, to reduce the latency of processing chroma in case of mode LDCRS or CCLM, when a square luma block larger than the luma ARA is split into 4 blocks by QT split, the corresponding chroma block can only be split into 4 blocks by QT split that can possibly be further split, or not split at all. For example, considering a luma ARA of size 32×32 and a chroma ARA of size 16×16, when a square luma block of size 64×64 is split into 4 32×32 blocks, the corresponding chroma block (of size 32×32 in 4:2:0 format) can only be split into 4 16×16 blocks by QT split that can possibly be further split (dotted line in the figure), or not split at all. Cases following those restrictions are shown in FIG. 11E.

In at least one embodiment, to reduce the latency of processing chroma in case of mode LDCRS or CCLM, when a square luma block larger than the luma ARA is split into 2 blocks with horizontal BT split, the corresponding chroma block can only be split into 2 blocks by horizontal BT split, or into 4 blocks by QT split. For example, considering a luma ARA of size 32×32 and a chroma ARA of size 16×16, when a square luma block of size 64×64 is split into 2 blocks of 32 lines and 64 columns, the corresponding chroma block (of size 32×32 in 4:2:0 format) can only be split into 2 blocks of 16 lines and 32 columns by horizontal BT split, or into 4 16×16 blocks by QT split. Cases following those restrictions are shown in FIG. 11F.

In at least one embodiment, to reduce the latency of processing chroma in case of mode LDCRS or CCLM, when a square luma block larger than the luma ARA is not split or split in 4 blocks by QT split or split in 2 blocks by horizontal QT split, the corresponding chroma block cannot be split into 2 blocks by vertical binary split but may split into 4 blocks by QT split, or 2 blocks by horizontal BT split, or not split.

In at least one embodiment, to reduce the latency of processing chroma in case of mode LDCRS or CCLM, when a square luma block larger than the luma ARA is split into 2 blocks with vertical BT split, the corresponding chroma block can only be split into 2 blocks by vertical BT split. For example, considering a luma ARA of size 32×32 and a chroma ARA of size 16×16, when a square luma block of size 64×64 is split into 2 blocks of 64 lines and 32 columns, the corresponding chroma block can only be split into 2 blocks of 32 lines and 16 columns. Cases following those restrictions are shown in FIG. 11G.

Example of Syntax Based on the VTM5.0 Syntax Described in Document JVET-N1001 (Version 9—Date 2019-06-25 13:45:21)

The text in small font below corresponds to an example of syntax, corresponding to an example implementation of the embodiments described above, based on the syntax described in the document JVET-N1001 version 9. The sections numbering corresponds to the numbering used in JVET-N1001 version 9.

Version where BT/TT Split is Forbidden for Blocks Larger than VDPU

The syntax description below corresponds to the embodiment restricting the partitioning, as described above. The changes to the VTM5 v9 specification are highlighted in italic font.

6.4.2 Allowed Binary Split Process
Inputs to this process are:
a binary split mode btSplit,
a coding block width cbWidth in luma samples,
a coding block height cbHeight in luma samples,
a location (x0, y0) of the top-left luma sample of the considered coding block relative to the top-left luma sample of the picture,
a multi-type tree depth mttDepth,
a maximum multi-type tree depth with offset maxMttDepth,
a maximum binary tree size maxBtSize,
a partition index partIdx,
a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed.

Output of this process is the variable allowBtSplit.

TABLE 6-2

Specification of parallelTtSplit and cbSize based on btSplit.

| | btSplit == SPLIT_BT_VER | btSplit == SPLIT_BT_HOR |
|---|---|---|
| parallelTtSplit | SPLIT_TT_VER | SPLIT_TT_HOR |
| cbSize | cbWidth | cbHeight |

The variables parallelTtSplit and cbSize are derived as specified in Table 6-2.

The variable allowBtSplit is derived as follows:
If one or more of the following conditions are true, allowBtSplit is set equal to FALSE:
 cbSize is less than or equal to MinBtSizeY
 cbWidth is greater than maxBtSize
 cbHeight is greater than maxBtSize
 treeType is not equal to SINGLE_TREE and cbWidth is greater than 32
 treeType is not equal to SINGLE_TREE and cbHeight is greater than 32
 mttDepth is greater than or equal to maxMttDepth
 *treeType is equal to DUAL_TREE_CHROMA and (cbWidth/SubWidthC)\*(cbHeight/SubHeightC) is less than or equal to 16* [Ed. (SL): is "less than or" needed here?]
Otherwise, if all of the following conditions are true, allowBtSplit is set equal to FALSE
. . .
Otherwise, allowBtSplit is set equal to TRUE.
6.4.3 Allowed Ternary Split Process
Inputs to this process are:
a ternary split mode ttSplit,
a coding block width cbWidth in luma samples,
a coding block height cbHeight in luma samples, a location (x0, y0) of the top-left luma sample of the considered coding block relative to the top-left luma sample of the picture,
a multi-type tree depth mttDepth
a maximum multi-type tree depth with offset maxMttDepth,
a maximum ternary tree size maxTtSize,
a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed.

Output of this process is the variable allowTtSplit.

TABLE 6-3

Specification of cbSize based on ttSplit.

| | ttSplit == SPLIT_TT_VER | ttSplit == SPLIT_TT_HOR |
|---|---|---|
| cbSize | cbWidth | cbHeight |

The variable cbSize is derived as specified in Table 6-3.
The variable allowTtSplit is derived as follows:
If one or more of the following conditions are true, allowTtSplit is set equal to FALSE:
  cbSize is less than or equal to 2*MinTtSizeY
  cbWidth is greater than Min(MaxTbSizeY, maxTtSize)
  cbHeight is greater than Min(MaxTbSizeY, maxTtSize)
  treeType is not equal to SINGLE_TREE and cbWidth is greater than 32
  treeType is not equal to SINGLE_TREE and cbHeight is greater than 32
  mttDepth is greater than or equal to maxMttDepth
  x0+cbWidth is greater than pic_width_in_luma_samples
  y0+cbHeight is greater than pic_height_in_luma_samples
  treeType is equal to DUAL_TREE_CHROMA and (cbWidth/SubWidthC)*(cbHeight/SubHeightC) is less than or equal to 32
Otherwise, allowTtSplit is set equal to TRUE.

Version where CCLM is Forbidden if a VDPU is Split into BT or TT

The syntax description below corresponds to an embodiment where CCLM (or CRS) is not enabled partitions not respecting the partitioning restrictions described above. For instance, CCLM is disabled for when the chroma block is of size 32×16, 16×32, or when its collocated luma block is 64×32 or 32×64. For other cases, CCLM (or CRS) is enabled. The changes to the VTM5 v9 specification are highlighted in italic font.

1.1.1 Derivation Process for Chroma Intra Prediction Mode

Input to this process are:
a luma location (xCb, yCb) specifying the top-left sample of the current chroma coding block relative to the top-left luma sample of the current picture,
a variable cbWidth specifying the width of the current coding block in luma samples,
a variable cbHeight specifying the height of the current coding block in luma samples.
a variable treeType specifying whether a single tree (SINGLE_TREE) or a dual tree is used to partition the CTUs.

In this process, the chroma intra prediction mode IntraPredModeC[xCb][yCb] is derived.

The corresponding luma intra prediction mode lumaIntraPredMode is derived as follows:
If intra_mip_flag[xCb][yCb] is equal to 1, lumaIntraPredMode is derived using IntraPredModeY[xCb+cbWidth/2][yCb+cbHeight/2] and sizeId set equal to MipSizeId[xCb][yCb] as specified in Table 8-4.
Otherwise, lumaIntraPredMode is set equal to IntraPredModeY[xCb+cbWidth/2][yCb+cbHeight/2].
A variable cclmEnabled is derived by invoking the subclause x.xx. Cross-component chroma intra prediction mode checking process.

The chroma intra prediction mode IntraPredModeC[xCb][yCb] is derived using intra_chroma_pred_mode[xCb][yCb] and lumaIntraPredMode as specified in Table 8-5 and Table 8-6.

TABLE 8-5

Specification of IntraPredModeC[ xCb ][ yCb ] depending on intra_chroma_pred_mode[ xCb ][ yCb ] and lumaIntraPredMode when cclmEnabled is equal to 0

| intra_chroma_pred_mode[ xCb ][ yCb ] | lumaIntraPredMode | | | | |
|---|---|---|---|---|---|
| | 0 | 50 | 18 | 1 | X ( 0 <= X <= 66 ) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |

TABLE 8-6

Specification of IntraPredModeC[ xCb ][ yCb ] depending on intra_chroma_pred_mode[ xCb ][ yCb ] and lumaIntraPredMode when cclmEnabled is equal to 1

| intra_chroma_pred_mode[ xCb ][ yCb ] | lumaIntraPredMode | | | | |
|---|---|---|---|---|---|
| | 0 | 50 | 18 | 1 | X ( 0 <= X <= 66 ) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 81 | 81 | 81 | 81 | 81 |
| 5 | 82 | 82 | 82 | 82 | 82 |
| 6 | 83 | 83 | 83 | 83 | 83 |
| 7 | 0 | 50 | 18 | 1 | X |

When chroma_format_idc is equal to 2, the chroma ultra prediction mode Y is derived using the chroma intra prediction mode X in Table 8-5 and Table 8-6 as specified in Table 8-7, and the chroma intra prediction mode X is set equal to the chroma intra prediction mode Y afterwards.

TABLE 8-7

Specification of the 4:2:2 mapping process from chroma intra prediction mode X to mode Y when chroma_format_idc is equal to 2

| mode X | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|

TABLE 8-7-continued

Specification of the 4:2:2 mapping process from chroma intra prediction mode X to mode Y when chroma_format_idc is equal to 2

| mode Y | 0 | 1 | 2 | 2 | 2 | 2 | 2 | 2 | 2 | 3 | 4 | 6 | 8 | 10 | 12 | 13 | 14 | 16 |
|---|---|---|---|---|---|---|---|---|---|---|---|---|---|---|---|---|---|---|
| mode X | 18 | 19 | 20 | 21 | 22 | 23 | 24 | 25 | 26 | 27 | 28 | 29 | 30 | 31 | 32 | 33 | 34 | 35 |
| mode Y | 18 | 20 | 22 | 23 | 24 | 26 | 28 | 30 | 32 | 33 | 34 | 35 | 36 | 37 | 38 | 39 | 40 | 41 |
| mode X | 36 | 37 | 38 | 39 | 40 | 41 | 42 | 43 | 44 | 45 | 46 | 47 | 48 | 49 | 50 | 51 | 52 | 53 |
| mode Y | 42 | 43 | 44 | 44 | 44 | 45 | 46 | 46 | 46 | 47 | 48 | 48 | 48 | 49 | 50 | 51 | 52 | 52 |
| mode X | | 54 | 55 | 56 | 57 | 58 | 59 | 60 | 61 | 62 | 63 | 64 | 65 | 66 | | | | |
| mode Y | | 52 | 53 | 54 | 54 | 54 | 55 | 56 | 56 | 56 | 57 | 58 | 59 | 60 | | | | | x.x.x Cross-Component Chroma Intra Prediction Mode Checking Process

Input to this process are:
a luma location (xCb, yCb) specifying the top-left sample of the current chroma coding block relative to the top-left luma sample of the current picture,
a variable cbWidth specifying the width of the current coding block in luma samples,
a variable cbHeight specifying the height of the current coding block in luma samples.

Output to this process is:
a flag lmEnabled specifying if a cross-component chroma intra prediction mode is enabled or not for the current chroma coding block.

In this process, cclmEnabled is derived as follows.
wColoc and hColoc are set equal to the width and height of the collocated luma coding block covering the location given by (xCb<<1, yCb<<1).
cclmEnabled is set equal to 1.
If sps_cclm_enabled_flag is equal to 0, cclmEnabled is set equal to 0.
Otherwise, if treeType is equal to SINGLE_TREE, cclmEnabled is set equal to 1.
Otherwise, if one of the following conditions is false, cclmEnabled is set equal to 0.
  cbWidth or cbHeight is greater than or equal to 32 and cbWidth is not equal to cbHeight.
  wColoc or hColoc is greater than or equal to 64 and wColoc is not equal to hColoc.

Embodiment 2a—Variant with Usage of an Inferred Enabling Flag for the Luma ARAs; Generalization to CCLM The concepts described above can also apply to other luma-to-chroma modes, such as the CCLM.

In a variant of embodiment 2, CCLM (or LDCRS) is disabled in the case where at least one of the following conditions is true:
  the considered chroma block is not entirely contained in a single chroma ARA.
  the luma ARA co-located with the chroma ARA contains at least one luma block not entirely inside the luma ARA, that is, one luma block crossing borders of the co-located luma ARA.

This can be implemented by the usage of an inferred flag hereafter named luma_blocks_inside_flag, assigned to each luma ARA. For each luma ARA, the flag is inferred from the luma partitioning tree (selected in the encoder or parsed in the decoder). Once the luma partitioning tree is generated for the CTU (or VDPU), the flag for each luma ARA of the CTU (or VDPU) is inferred as follows. If all the luma blocks of a given luma ARA are strictly included the luma ARA, the flag is set to true. Otherwise, if at least one luma block crosses one or more of the luma ARA borders, the flag is set to false.

The flag can then be used as follows. The condition (mentioned above):
  the luma ARA co-located with the chroma ARA contains at least one luma block not entirely inside the luma ARA, that is, one luma block crossing borders of the co-located luma ARA.

Can be equivalently formulated as follows:
  the flag luma_blocks_inside_flag of the luma ARA co-located with the chroma ARA is false.

Embodiment 2b—LDCRS or CCLM Enabled if it is Inside its Collocated Luma Block

In another variant, the luma-dependent mode (LDCRS or CCLM) is disabled if the chroma block is not entirely inside its collocated luma block.

This can be expressed as follows. LDCRS or CCLM is disabled if one of the following conditions is false:
  The luma block collocated with the top-left sample of the chroma block (at position (x0,y0) and of size (Wc,Hc)) is inside 32×32 chroma ARA
  xColocY<=2*x0
  xColocY+wColocY>=2*(x0+We−1)
  yColocY<=2*y0
  yColocY+hColocY>=2*(y0+He−1)
  (xColocY, yColocY) being the top-left sample position of the luma block collocated with the top-left sample of the chroma block, and (wColocY, hColocY) being the dimensions of this luma block.

Embodiment 2c—Usage of a Fallback Mode when LDCRS or CCLM is Disabled

At least one embodiment is related to CCLM mode (and its variant MDLM). In this embodiment, it is considered that there is a conventional CCLM mode, plus a fallback CCLM mode. The fallback CCLM can be used when the conventional CCLM mode is not enabled due to restrictions described in this application.

The block diagram in the FIG. 11A provides a simplified block diagram of the CCLM process activation. In step 112, the conditions for activation the conventional CCLM mode for a given chroma block are checked (such conditions are described in various embodiments of the current application). If all the enabling conditions are satisfied for the given chroma block, the conventional CCLM mode is enabled and can be used by the encoder/decoder (113). If one of the enabling conditions is not satisfied for the given chroma block, the conventional CCLM mode is disabled, and the fallback CCLM mode is enabled and can be used by the encoder/decoder (114).

In at least one embodiment, the conventional CCLM mode corresponds to a mode where the CCLM parameters are derived from luma and chroma samples in the close neighborhood of the considered chroma block (e.g. chroma samples belonging to the one or two lines on top of the chroma block, and their collocated luma samples, and/or chroma samples belonging to the one or two columns on the left of the chroma block, and their collocated luma samples).

Possible Fallback CCLM Modes

In at least one embodiment, the fallback CCLM mode uses the CCLM parameters derived from chroma and luma samples neighboring the current CTU. For instance, the one or two lines on top of the CTU and/or the one or two columns on the left of the CTU are used.

In at least one embodiment, the fallback CCLM mode uses the CCLM parameters derived from chroma and luma samples neighboring the current VDPU. For instance, the one or two lines on top of the VDPU and/or the one or two columns on the left of the VDPU are used.

In at least one embodiment, the fallback CCLM mode uses the CCLM parameters derived from chroma and luma samples neighboring the current 16×16 chroma ARA and its 32×32 corresponding luma ARA. For instance, the one or two lines on top of the current 16×16 chroma ARA and its 32×32 corresponding luma ARA and/or the one or two columns on the left of the current 16×16 chroma ARA and its 32×32 corresponding luma ARA are used.

In at least one embodiment, the fallback CCLM mode uses the CCLM parameters derived from the luma samples neighboring the luma block collocated with the top-left sample of the chroma block, and from the chroma samples collocated to these luma samples.

In at least one embodiment, the fallback CCLM mode uses the latest used CCLM parameters.

Usage of a History List of CCLM Parameters

In at least one embodiment, the fallback CCLM mode uses CCLM parameters from a history list of CCLM parameters built at the encoder and at the decoder. A maximum size Nh is specified for the history list. The history list is populated with the latest used CCLM parameters. If a chroma block uses CCLM mode, its CCLM parameters are added to the history list. If the history list is already full, the oldest CCLM parameters are removed, and the new ones are inserted in the history list.

In one variant, new CCLM parameters are added to the history list only if they are different from the CCLM parameters already present in the history list.

In one variant, the index of the CCLM parameters from the CCLM parameters history list is coded for the chroma block if it is coded using the fallback CCLM mode.

In one variant, the index of the CCLM parameters from the history list is inferred based on a similarity check of the luma and/or chroma samples inside or surrounding the chroma block with the luma and/or chroma samples having been used to compute the CCLM parameters of the list.

One possible implementation of the latter variant is as follows. When CCLM parameters are inserted in the history list, the average values of the luma samples used for deriving the parameters are computed and stored into the list. They are noted avg_Ref_Y[idx], idx being the index in the history list of CCLM parameters (idx=0 to Nh−1, Nh being the size of the history list).

When CCLM mode is used for a chroma block, the average values of luma samples neighboring (only luma samples being available are considered) the chroma block are computed. They are noted avg_Cur_Y.

The CCLM parameters index idx0 in the list, used for performed the CCLM prediction of the chroma block, is identified as the index which minimizes the absolute value of the difference between avg_Ref_Y[i] and avg_Cur_Y:

idx0=argmin(|avg_Cur_*Y*−avg_Ref_*Y*[idx]|)

The similarity metric can alternatively be based on the chroma samples. When CCLM parameters are inserted in the history list, the average values of the chroma samples used for deriving the parameters are computed and stored into the list. They are noted avg_Ref_Cb[idx], avg_Ref_Cr [idx].

When CCLM mode is used for a chroma block, the average values of the chroma samples neighboring the chroma block are computed. They are noted avg_Cur_Cb and avg_Cur_Cr.

The CCLM parameters index idx0 in the list, used for performed the CCLM prediction of the chroma block, is identified as the index which minimizes the absolute value of the difference between avg_Ref_Cb[idx], avg_Ref_Cr [idx] and avg_Cur_Cb, avg_Cur_Cr:

idx0=argmin(|avg_Cur_*Cb*−avg_Ref_*Cb*[idx]|+|avg_Cur_*Cr*−avg_Ref_*Cr*[idx]|)

Figure 11B:
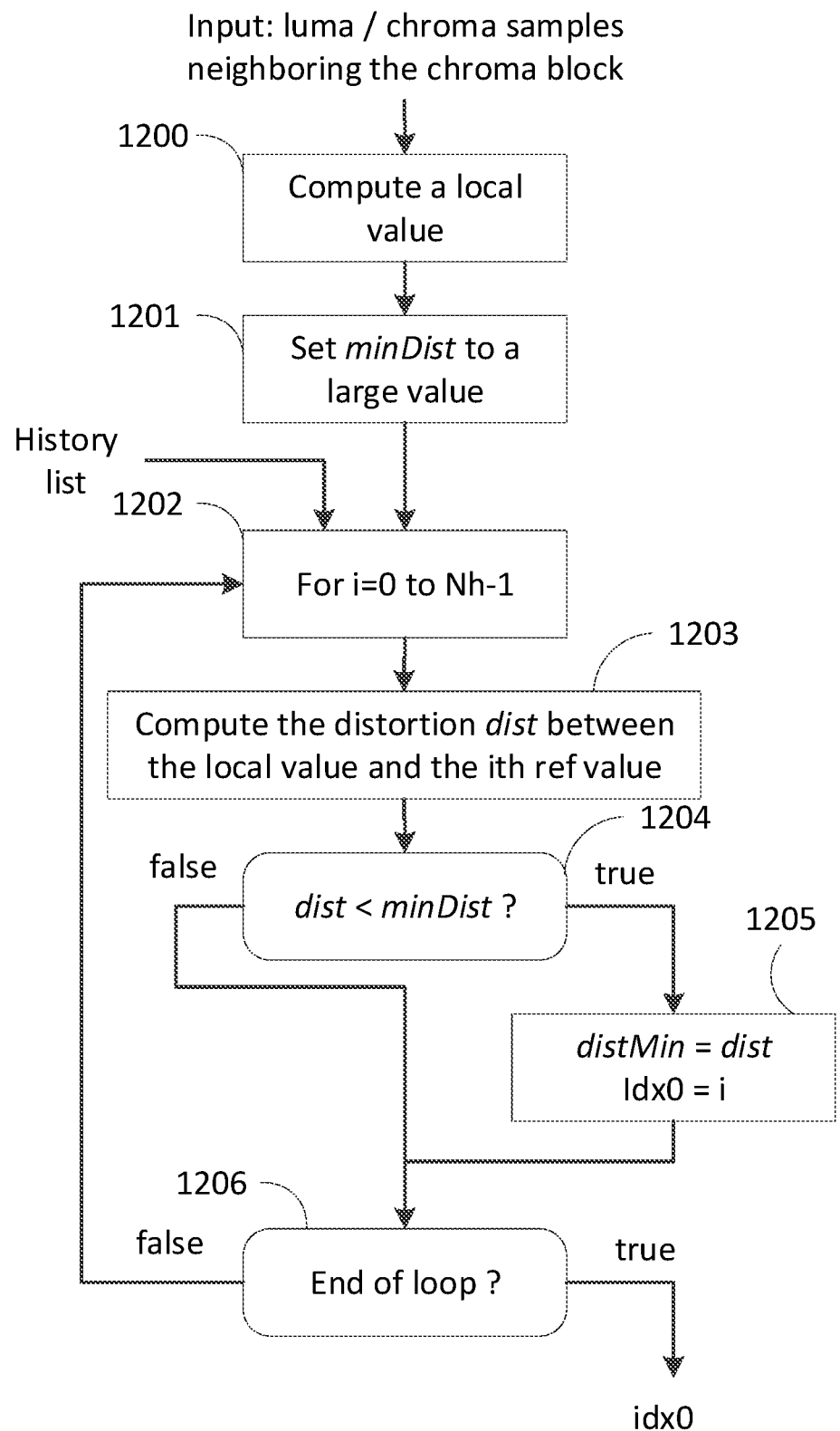
Figure 11C:
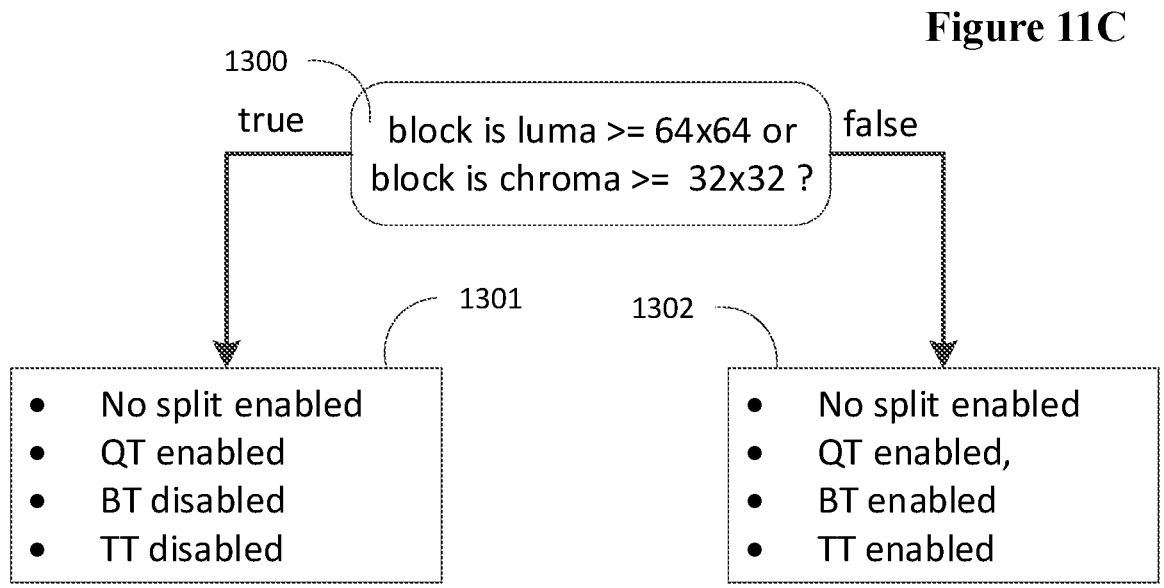
Figure 11D:
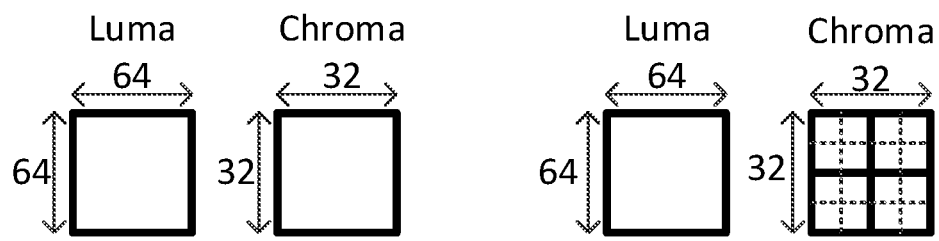
Figure 11E:
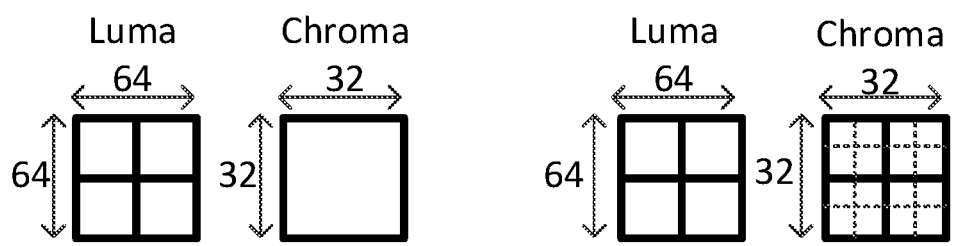
Figure 11F:
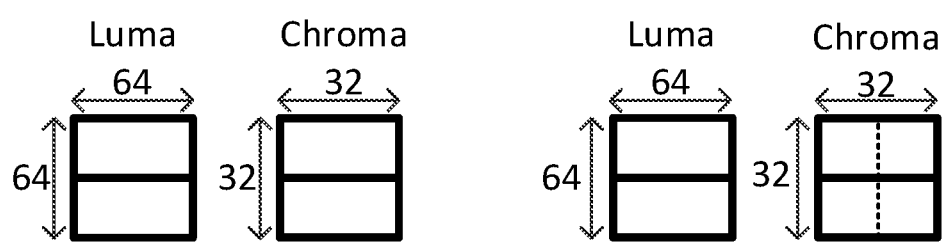
Figure 11G:
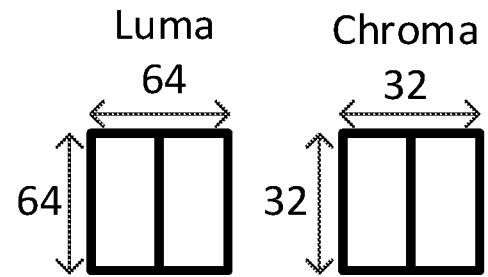

The FIG. 11B depicts a simplified block diagram of an example of index selection process from the history list. The inputs of the process are the luma and/or chroma samples neighboring the considered chroma block, and the history list. The history list contains, for each index i, CCLM parameters and reference values related to the luma or chroma samples used for deriving the CCLM parameters (e.g. avg_Ref_Y[i], avg_Ref_Cb[i], avg_Ref_Cr[i]). In step 1200, a local value is computed from the neighboring luma or chroma samples neighboring the chroma block (e.g. avg_Cur_Y, avg_Cur_Cb, avg_Cur_Cr). In step 1201, a parameter distMin is set to a large value. In step 1202, a loop over the index=0 to Nh−1. In step 1203, the distortion "dist" between the local value computed in step 1200, and the reference value of index i. Step 1204 checks if dist is lower than minDist. If this is true, idx0 and minDist values are updated in step 1205, and then the process goes to step 1206. Otherwise (dist is not lower than minDist), the process goes to step 1206. Step 1206 checks if the end of the loop over the history list indexes is done. If yes, idx0 is output index value. If no, the process goes back to step 1202 for checking the next index.

Embodiment 3—LDCRS Enabled if the Chroma Block does not Cross ARAs Borders and if at Least One of the Co-Located Luma Blocks does not Cross the Co-Located Luma ARA Borders In an embodiment, LDCRS is enabled in the case where all the following conditions are true:

the considered chroma block is entirely contained in a single chroma ARA at least one of the luma blocks co-located with the considered chroma block is entirely contained in the luma ARA co-located with the chroma ARA. Such luma blocks are named in the following "co-located enabled luma blocks".

A simplified block diagram of the process is shown in FIG. 12. Step 500 checks if the chroma block is inside one single chroma ARA. If this condition is false, LDCRS is disabled (step 501). If this condition is true, the luma blocks co-located with the considered chroma block are identified (step 502). Step 503 checks if at least one of the co-located luma blocks is inside the luma ARA co-located with the chroma ARA. If this condition is false, LDCRS is disabled (step 504). If this condition is true, LDCRS is enabled (step 505).

Referring to FIG. 13 (that shows same partitioning as the top pictures of FIG. 11), LDCRS is enabled, because the chroma block is inside one single chroma ARA, and co-located luma blocks 1 and 2 are inside the co-located luma ARA, i.e. at least one of the luma blocks co-located with the considered chroma block is entirely contained in the luma ARA co-located with the chroma ARA.

Referring to FIG. 14, LDCRS is disabled, because the chroma block covers two chroma ARAs (the $1^{st}$ chroma ARA and the $2^{nd}$ chroma ARA), even if two of its co-located luma blocks (coloc luma blocks 1 and 2) are inside the luma ARA co-located with the first chroma ARA.

Embodiment 4—LDCRS Enabled in the Case where at Least One of the Co-Located Luma Blocks do not Cross the Co-Located Luma ARA Borders In an embodiment, even if the considered chroma block is not entirely contained in a single chroma ARA, LDCRS can be enabled in the case where at least one of the luma blocks co-located with the considered chroma block is entirely contained in the luma ARA co-located with the first chroma ARA of the considered chroma block. In this embodiment, the considered chroma block may be larger than one single chroma ARA.

A simplified block diagram of the process is shown in FIG. 15. The luma blocks co-located with the considered chroma block are identified (step 600). Step 601 checks if at least one of the co-located luma blocks is inside the luma ARA co-located with the first chroma ARA. If this condition is false, LDCRS is disabled (step 602). If this condition is true, LDCRS is enabled (step 603).

FIG. 16 shows same partitioning as FIG. 14. LDCRS is enabled, because even if the chroma block covers two chroma ARAs (the first and the second chroma ARAs), some of its co-located luma blocks (blocks 1 and 2) are inside the luma ARA co-located with the first chroma ARA of the chroma block.

In a variant of the current embodiment, in the case where LDCRS is enabled and activated for the chroma block, the scaling factor used for scaling the chroma residual is derived only from the luma samples belonging to the co-located enabled luma blocks. All chroma samples use the same scaling factor derived from only a part of the co-located luma samples.

For example, considering the case of FIG. 16, the average of luma samples from coloc luma blocks 1 and 2 is computed. This average luma value is used to identify the scaling factor to be applied to the entire chroma block residual. Thus, luma samples of luma block 3 are not used.

Embodiment 5: Scaling Factor Signaling for Chroma Blocks for which LDCRS is Disabled In an embodiment, in the case where a chroma block does benefit from the luma-based chroma residual scaling, the chroma scaling factor is signaled in the bitstream. If the chroma block is made of several Transform units, the chroma scaling factor applies to the residual for each TU.

A simplified block diagram of the process is shown in FIG. 17. Step 700 checks if LDCRS is enabled for the considered chroma block. If this condition is false, the scaling factor or scaling factor index is coded/decoded (step 701). If this condition is true, the scaling factor or scaling factor index is derived from the co-located luma blocks (step 702).

In an embodiment, the index of the chroma scaling factor is signaled. In an embodiment, the scaling factor, or the index of the scaling factor, is predicted from the scaling factor, or scaling factor index, of one or several neighboring chroma blocks previously coded/decoded. For instance, as illustrated in FIG. 18, the scaling factor, or scaling factor index, from the chroma block containing block A, then B if block A is not available, then C if block A and block B are not available, then block D if block A and block B and block C are not available, is used as predictor. Otherwise the scaling factor, or scaling factor index is not predicted.

In a variant, the scaling factor is inferred by a prediction process, using the neighboring chroma blocks already processed. No additional signaling is used, and only the inferred scaling value is used for the considered chroma block.

Embodiment 6: Delta OP Signaling for Chroma Blocks where LDCRS is Disabled

In an embodiment, in the case where a chroma block does benefit from the luma-based chroma residual scaling, a delta QP parameter signaled in the bitstream may be used for this chroma block. If the chroma block is made of several Transform units, the delta QP parameter applies to the residual for each TU.

In an embodiment, the delta QP parameter is signaled for the chroma block.

In an embodiment, the delta QP parameter is signaled for the Quantization Group that contains the chroma block.

In an embodiment, the delta QP parameter is signaled for the CTU that contains the chroma block.

In an embodiment, the chroma QP parameter is predicted based on the QP value or scaling factor from one or several neighboring chroma blocks previously coded/decoded. For instance, as illustrated in FIG. 18, the QP value or scaling factor from the chroma block containing block A, then block B if block A is not available, then block C if block A and block B are not available, then block D if block A and block B and block C are not available, is used as predictor.

In the case where the predictor is a scaling factor sc, this scaling factor used for predicting the chroma QP is first converted to a QP-like value, noted QPpred, using the following equation:

$$QP\text{pred}=-6*\text{Log }2(Sc)$$

where Log 2 is the base 2 logarithmic function.

In the case where the predictor is a QP value, this QP value is used as predictor QPpred.

In a variant, the QP value is inferred by a prediction process, using the neighboring chroma blocks already processed. No additional signaling is used, and only the inferred QP value is used for the considered chroma block.

Embodiment 7: Extension to Other Luma-Dependent Chroma Coding Modes

The embodiments disclosed with respect to luma-based chroma residual scaling may be used with other luma-dependent chroma coding modes or more generally to coding tools involving a cross-component dependency, e.g. the chroma-from-luma intra prediction (a.k.a. CCLM or LM mode, and its variant Multiple Direction Linear Model a.k.a. MDLM).

In an additional embodiment, in case of a luma block with dimensions WL and HL larger than WmaxL and HmaxL, CCLM can be enabled only in the case where the luma block is split in Transform Units of maximum dimensions WmaxL and HmaxL.

In the same way, in case of a luma block with dimensions WL and HL larger than WmaxL and HmaxL, chroma residual scaling can be enabled only if the luma block is split in Transform Units of maximum dimensions WmaxL and HmaxL.

In an additional embodiment, in case of a luma block with dimensions WL and HL larger than WmaxL and HmaxL, then the luma block is systematically split in Transform Units of maximum size WmaxL and HmaxL. This way, chroma residual scaling and/or CCLM modes can be used in the chroma component without suffering from the structural delay implied by the need for availability of the reconstructed co-located luma block in order to process the chroma blocks.

In an additional variant, in case of a chroma block with dimensions We and He larger than WmaxC and HmaxC, then the chroma block is systematically split in Transform Units of maximum size WmaxC and HmaxC. This way, chroma residual scaling and/or CCLM modes can be used in the chroma component whatever the size of the chroma coding unit.

The luma block splitting into 2 TUs (left side) or 4 TUs (right side) is illustrated in the examples of FIG. 19.

In a variant, accordingly, if the chroma block has dimensions We and He larger than WmaxC and HmaxC, CCLM can be enabled only if the chroma block is split in Transform Units of maximum dimensions WmaxC and HmaxC.

In the same way, if the chroma block has dimensions We and He larger than WmaxC and HmaxC, chroma residual scaling can be enabled only if the chroma block is split in Transform Units of maximum dimensions WmaxC and HmaxC.

Embodiment 8: De-Activation of Separate Luma/Chroma Tree for CTUs Using Reference Samples Availability for CCLM CCLM mode uses reference luma and chroma samples to determine parameters further used to predict the chroma block samples from their co-located luma samples. The reference luma and chroma samples are typically located:
on the top line(s) neighboring the chroma/co-located luma block,
on the left column(s) neighboring the chroma/co-located luma block,
possibly on the top-left location(s) neighboring the chroma/co-located luma block. Combinations of these three locations can be used depending on the considered CCLM mode.

In an embodiment, the chroma reference samples used for the CCLM mode are considered as available if they belong to chroma blocks included in the top/left/top-right neighboring chroma ARAs of the chroma ARA comprising the chroma block under consideration (FIG. 20). If the chroma reference samples are not included in the top/left/top-right neighboring chroma ARAs, they are considered as non-available.

FIG. 21 illustrates a case where the top reference chroma samples (in the diagonal-hatched rectangle above the Chroma block) used for the chroma block belong to different luma blocks (Blocks 1, 3 and 4), and some of those luma blocks (Blocks 3 and 4) are not inside the neighboring Top Chroma ARA. According to the embodiment, only the reference samples belonging to Block 1 are considered as available. The other reference samples from Block 3 and Block 4 are not available for the CCLM mode.

In a variant, the CCLM mode is disabled if a given proportion (e.g. 30%) of the chroma reference samples used for CCLM prediction are not included in the neighboring top/left/top-right chroma ARAs.

On FIG. 21, the number of available reference samples is equal to 25% of the total number of reference samples. Thus, CCLM would be disabled.

In a variant, the CCLM mode is disabled as soon as at least one chroma reference sample used for CCLM prediction is not included in the neighboring top/left/top-right chroma ARAs.

Referring to FIG. 21, as at least one reference sample is not available in this illustration, CCLM would be disabled.

Similarly, for the luma reference samples used for CCLM, the following embodiment is proposed. The luma reference samples used for the CCLM mode are considered as available if they belong to luma blocks included in the luma ARA co-located with the neighboring chroma ARAs at the top/left/top-right of the chroma ARA comprising the chroma block under consideration (FIG. 20). If the luma reference samples are not included in the neighboring top/left/top-right luma ARAs co-located with the neighboring top/left/top-right neighboring chroma ARAs, they are considered as non-available.

In a variant, the CCLM mode is disabled if a given proportion (e.g. 30%) of the luma reference samples are not included in the neighboring top/left/top-right luma ARAs co-located with the top/left/top-right neighboring chroma ARAs.

In a variant, the CCLM mode is disabled if at least one luma reference sample is not included in the neighboring top/left/top-right luma ARAs co-located with the neighboring top/left/top-right chroma ARAs.

Embodiment 9: De-Activation of Separate Luma/Chroma Tree for CTUs Using CCLM

In an embodiment, in the case where at least one chroma block inside the CTU uses CCLM (or LDCRS), the separate luma/chroma tree is disabled, and chroma partitioning for the CTU is deduced from the luma partitioning.

In a variant, a flag is signaled at the CTU level to indicate if CCLM (or LDCRS) is used in the CTU or not.

The concept can be generalized for block types different from CTUs (for example Video Decoding Processing Unit, a.k.a. VDPU).

Embodiment 10: Chroma Residual Scaling Based on Neighboring Samples of Luma Block Co-Located with the Top Left Corner of the Chroma Block In another embodiment, the potential hardware latency issue is further reduced by determining a scaling factor to be used in the chroma residual scaling of a chroma block from the prediction or reconstructed luma samples already processed in the neighborhood of the luma block co-located with a given position in the chroma block. Those samples are called in the following "neighboring luma samples".

FIG. 22 depicts a flowchart of the method for determining a scaling factor to be used in the chroma residual scaling of a chroma block.

In step 800, the position in the picture of a given sample position in the chroma block is identified. In step 801, the luma block comprising the luma sample co-located with the position in the chroma block is identified. In step 802, already processed luma samples neighboring the luma block are identified. In step 803, a luma value is determined from those identified neighboring luma samples, for example the average value of the identified neighboring luma samples. In step 804, a scaling factor for the chroma block is determined based on the luma value. In step 805, the chroma block residual is scaled using the scaling factor.

In an embodiment, the given sample position in the chroma block is the top-left corner of the chroma block. This is illustrated in the FIG. 23A. The chroma block (rectangular) is indicated in bold lines. The co-located luma block (square) to the top-left sample of the chroma block is in thin line. Its neighboring samples are indicated in grey color. In a variant, the given sample position in the chroma block is the center of the chroma block.

In an embodiment, only one neighboring luma sample is used, and corresponds to the top or left sample of the top-left sample of the co-located luma block. This is illustrated in the FIG. 23B. In a variant, both top and left samples are used.

In another embodiment, the neighboring luma samples are made of the neighboring top line of size WL, and of the neighboring left column line of size HL, WL and HL being the horizontal and vertical dimensions of the luma block. This is illustrated in the FIG. 23C.

In another embodiment, the neighboring luma samples are made of the neighboring top line of size minS, and of the neighboring left column line of size minS, where minS is the minimum value among WL and HL.

In another embodiment, the neighboring luma samples are made of the neighboring top line of size Wc*2, and of the neighboring left column line of size Hc*2, Wc and Hc being the horizontal and vertical dimensions of the chroma block and considering that the chroma format is 4:2:0.

In another embodiment, the neighboring luma samples are made of the neighboring top line of size minSC*2, and of the neighboring left column line of size minSC*2, where minSC is the minimum value among Wc and Hc.

Figure 23A:
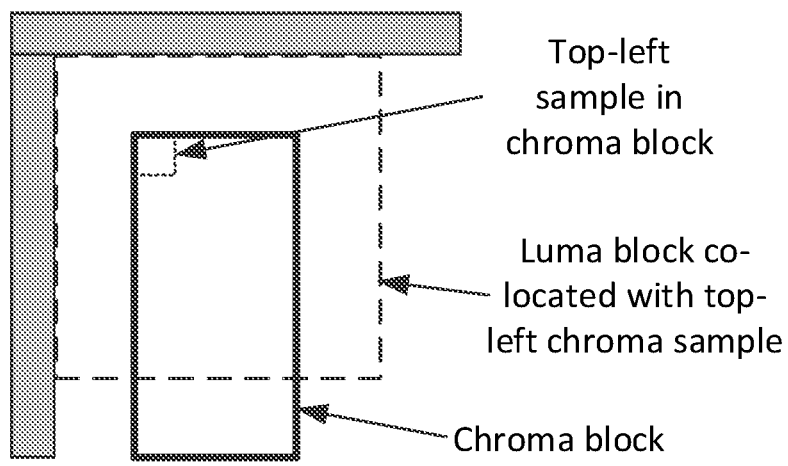
Figure 23B:
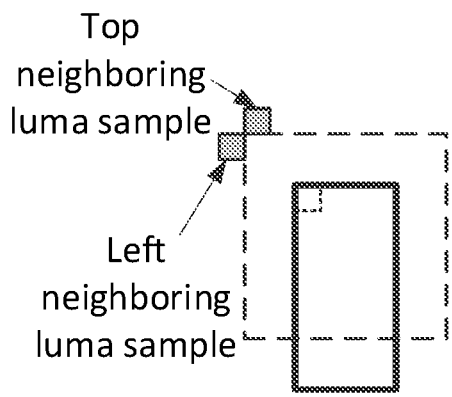
Figure 23C:
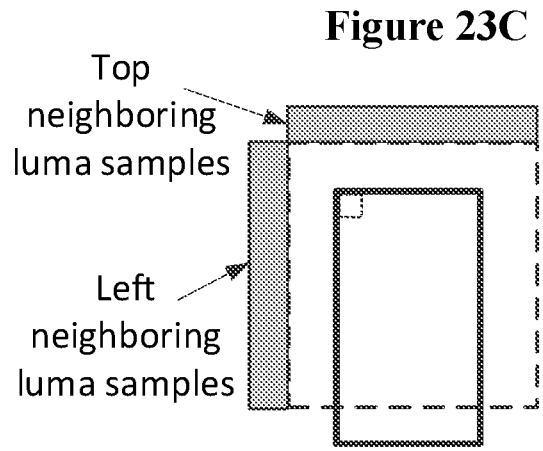
Figure 23D:
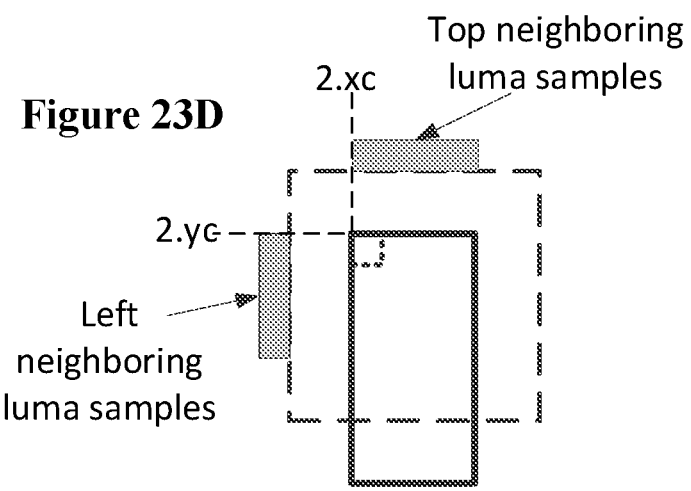

In a variant, the neighboring top line of size minSC*2 starts at the same relative horizontal position as the chroma top-left corner, and the neighboring left column line of size minSC*2 starts at the same relative vertical position as the chroma top-left corner, as illustrated in the FIG. 23D. For example, if the top-left corner in the chroma block is at location (xc,yc) in the chroma picture, and the chroma format is 4:2:0, the first sample in the top line of neighboring luma samples is at horizontal location 2*xc, and the first sample in the left column of neighboring luma samples is at vertical location 2*yc.

According to a further variant, the neighboring samples used to determine scaling factor to be applied on the residual current chroma block are made of one or more reconstructed luma samples which belong to the bottom line and/or the right column of luma samples which respectively belong to the top and left neighboring ARAs of the ARA that contains the current chroma block.

In another embodiment, if a given proportion of the neighboring luma samples is not available, the chroma block residual scaling is not applied.

In another embodiment, a neighboring luma sample is considered as non-available if it is not in the same CTU as the chroma block.

In another embodiment, a neighboring luma sample is considered as non-available if it is not in the same VDPU as the chroma block.

In another embodiment, a neighboring luma sample is considered as non-available if it is not in the same luma ARA co-located with the first chroma block ARA.

In another embodiment, if a given proportion of the chroma samples in a considered neighborhood is not available, the chroma block residual scaling is not applied. This may happen in the case where neighboring chroma blocks are not yet available in their reconstructed state, at the time the current chroma block is being processed.

In an embodiment, the neighboring luma samples used to derive the chroma residual scaling factor are the samples used to predict the co-located luma block (also often known as intra prediction reference samples). In dual tree case, for each given area (e.g. VDPU), it is common to process first the luma blocks of the given area, then to process the chroma blocks of the given area. When the current embodiment applies, this means that it would be necessary to store for each luma block of the given area its neighboring luma samples, which requires additional memory storage and makes the process complicated as the number of reference samples varies depending on the block size. In order to reduce these negative impacts, in one embodiment, only the luma value derived in step 803 from the neighboring luma samples is stored for each luma block. In another embodiment, only the scaling factor derived in step 804 from the luma value derived in step 803 from the neighboring luma samples is stored for each luma block. This limits the storage to one single value per luma block. This principle can be extended to other modes than LMCS, for instance CCLM, where instead of storing the luma and chroma samples of each block, only the minimum and maximum values of the luma and chroma samples used to derive the CCLM parameters of the block are stored.

The concept of embodiment 10 can be generalized to the CCLM mode. In this case, the current embodiment consists in determining the CCLM linear parameters to be used for the prediction of the chroma block from the prediction or reconstructed luma samples (neighboring luma samples) and the prediction or reconstructed chroma samples (neighboring chroma samples) already processed in the neighborhood of the luma block co-located with a given position in the chroma block. FIGS. 23A to 23D illustrate this concept. The rectangle areas filled in grey correspond to neighboring samples (luma and chroma) of the luma block collocated with the top-left sample of the current chroma block, that are potentially used for the derivation of the CCLM parameters.

According to a variant, the luma and/or chroma neighboring samples used to determine the linear model to be used to perform the CCLM prediction of a current chroma block are made of at least one reconstructed or predicted luma and/or chroma samples which belong to the bottom line and/or to the right column of luma and/or chroma samples, which respectively belong to the top and/or to left neighboring luma and/or chroma ARAs of the ARA that contains the current chroma block. The concept can be extended to the bottom lines of the top-right neighboring luma and/or chroma ARAs of the ARA that contains the current chroma block, and to the right columns of the bottom-left neighboring luma and/or chroma ARAs of the ARA that contains the current chroma block. The concept can be extended to the bottom lines of the top-right neighboring luma and/or chroma ARAs of the ARA that contains the current chroma block, and to the right columns of the bottom-left neighboring luma and/or chroma ARAs of the ARA that contains the current chroma block.

Embodiment 11: Luma Sample Availability Checking Based on its Location Relative to the Chroma Block In another embodiment, if the distance between a neighboring luma sample at position (xL,yL) and the position of top-left sample of the considered chroma block (xC, yC) is higher than a given value, the neighboring luma sample is considered as non-available. In other words, a neighboring luma sample is considered as non-available if the following condition is true:

$$((xC*2)-xL)>TH \text{ or } ((yC*2)-yL)>TV$$

Or equivalently $$(xC-(xL/2))>TH/2 \text{ or } (yC-(yL/2))>TV/2$$

where TH and TV are values predefined or signalled in the bitstream. Typically, TH=TC=16. In a variant, TH and TC depend on the picture resolution. For instance, TH and TH are defined according to the following conditions:
  If the picture resolution is below or equal to 832×480 luma samples, TH=TC=8,
  Otherwise if the picture resolution is below or equal to 1920×1080 luma samples, TH=TC=16,
  Otherwise, TH=TC=32.

FIGS. 24A and 24B illustrate examples of distances between the top-left neighboring luma sample and neighboring chroma samples (scaled by 2 in case of 4:2:0 chroma format). FIG. 24A illustrates a distance between the top-left chroma sample and the top-left neighboring chroma sample of the collocated luma block. FIG. 24B illustrates a distance between the top-left chroma sample and the top line or left column.

In a variant, instead of strictly disabling samples too far from the top-left chroma sample, a weighting dependent on the distance between the neighboring chroma sample and the top-left chroma sample is applied to the considered reference sample.

In a variant, instead of strictly disabling samples too far from the top-left chroma sample, a weighting dependent on the distance between the neighboring chroma sample and the top-left chroma sample is applied to the considered reference sample.

Embodiment 12: Luma Sample Availability Checking Based on the Value of its Collocated Chroma Samples Relatively to the Value of Chroma Samples of the Current Block In another embodiment, the availability of a neighboring luma sample neighborY is based on the values of its collocated Cb and Cr chroma samples, neighborCb, neighborCr, and of the prediction Cb and Cr chroma samples of the current chroma block. For instance, if the following conditions are true, the neighboring luma sample neighbor is considered as non-available:

If Abs(topLeft$Cb$–neighbor$Cb$)>Th_Ch or

Abs(topLeft$Cr$–neighbor$Cr$)>Th_Ch where Th_Ch is a value predefined or signalled in the bitstream, and Abs is the absolute value function. Th_Ch may depend on the bit-depth of the chroma samples. Typically, Th_Ch=64 for 10-bit content, 32 for 8-bit content.

In a variant, the chroma residual scaling is only applied if the average Cb and Cr values avgNeighCb, avgNeighCr of chroma samples collocated with the neighboring luma samples are not too far from the average Cb and Cr values avgCurrCb, avgCurrCr of chroma samples of the current chroma block.

For instance, if the following conditions are true, the neighboring luma sample is considered as non-available:

If Abs(avgCurr$Cb$–avgNeigh$Cb$)>Th_Ch or

Abs(avgCurr$Cr$–avgNeigh$Cr$)>Th_Ch

In a variant, instead of strictly disabling samples too different from the top-left chroma sample, a weighting dependent on the difference between the neighboring chroma sample and the top-left chroma sample is applied to the considered reference sample. In a variant, instead of strictly disabling samples too different from the top-left chroma sample, a weighting dependent on the difference between the neighboring chroma sample and the top-left chroma sample is applied to the considered reference sample.

FIG. 25 depicts a flowchart of the method for checking luma sample availability based on its collocated chroma samples and on chroma samples of the current block. Step 800 to 802 are similar as corresponding steps of FIG. 22. Step 900 is inserted after step 802 to identify the neighboring chroma samples collocated with the neighboring luma samples. In step 901, the similarity of neighboring chroma samples and of chroma samples of current block is checked. If chroma samples are similar, chroma residual scaling is enabled for the current chroma block (903). If samples are considered as not similar, chroma residual scaling is disabled for the current chroma block (902).

Embodiment 12a: Reference Samples Availability for MDLM

MDLM mode is a variant of CCLM mode that uses either the top neighboring luma and chroma samples (MDLM top), or the left neighboring luma and chroma samples (MDLM left) as reference samples for deriving the linear parameters for the prediction of chroma samples from luma samples.

In at least one embodiment, when the splitting process leads to a partitioning of a luma VDPU comprising 2 top square blocks of half width/height of the VDPU width/height, or to a partitioning of a chroma VDPU comprising 2 top square blocks of half width/height of the VDPU width/height chroma VDPU, the reference samples for MDLM left of the second square block (noted "2" in the FIG. 25A) are only the samples neighboring the left border of the block 2. The samples below those reference samples are considered as not available. This advantageously limits the latency for processing block 2, since the blocks below block 2 are not needed for deriving the MDLM parameters.

This embodiment can also be generalized for the case where the luma or chroma block 1 of FIG. 25A is further split in smaller partitions.

Embodiment 13: Low-Level Flag for Activating or De-Activating the Chroma Residual Scaling In another embodiment, a low-level flag is inserted in the bitstream syntax to enable or disable the chroma residual scaling tool at a lower level than a slice or a tile group. This embodiment can apply only in case of separate luma/chroma partitioning tree case. It can be extended also to the case where separate luma/chroma partitioning tree is not used.

The following table shows an example of syntax change (highlighted in italic font), compared to the VTM specification of document JVET-N0220. In this table, the signalling is made at the CTU level, and the signalling is done only in separate luma/chroma partitioning tree (identified by the syntax element qtbtt_dual_tree_intra_flag) case.

|  | Descriptor |
|---|---|
| coding_tree_unit( ) { |  |
|   xCtb = ( CtbAddrInRs % PicWidthInCtbsY ) << CtbLog2SizeY |  |
|   yCtb = ( CtbAddrInRs / PicWidthInCtbsY ) << CtbLog2SizeY |  |
|   if( tile_group_sao_luma_flag \|\| tile_group_sao_chroma_flag ) |  |
|     sao( xCtb >> CtbLog2SizeY, yCtb >> CtbLog2SizeY ) |  |
|   if( tile_group_alf_enabled_flag ){ |  |
|     alf_ctb_flag[ 0 ][ xCtb >> Log2CtbSize ][ yCtb >> Log2CtbSize ] | ae(v) |
|     if( alf_chroma_idc = = 1 \|\| alf_chroma_idc = = 3 ) |  |
|       alf_ctb_flag[ 1 ][ xCtb >> Log2CtbSize ][ yCtb >> Log2CtbSize ] | ae(v) |
|     if( alf_chroma_idc = = 2 \|\| alf_chroma_idc = = 3 ) |  |
|       alf_ctb_flag[ 2 ][ xCtb >> Log2CtbSize ][ yCtb >> Log2CtbSize ] | ae(v) |
|   } |  |
|   *if( qtbtt_dual_tree_intra_flag &&* |  |
|     *tile_group_chroma_residual_scale_flag )* |  |
|     *ctu_chroma_residual_scale_flag* |  |
|   if( tile_group_type = = I && qtbtt_dual_tree_intra_flag ) |  |
|     dual_tree_implicit_qt_split ( xCtb, yCtb, CtbSizeY, 0 ) |  |
|   Else |  |
|     coding_tree( xCtb, yCtb, CtbSizeY, CtbSizeY, 1, 0, 0, 0, 0, 0, SINGLE_TREE ) |  |
| } |  |

The following table shows another example of syntax change (highlighted in italic font), compared to the VTM specification of document JVET-N0220. In this table, the signalling is made at the CTU level, and the signalling is done whatever separate luma/chroma partitioning tree is used or not.

|  | Descriptor |
|---|---|
| coding_tree_unit( ) { |  |
|   xCtb = ( CtbAddrInRs % PicWidthInCtbsY ) << CtbLog2SizeY |  |
|   yCtb = ( CtbAddrInRs / PicWidthInCtbsY ) << CtbLog2SizeY |  |
|   if( tile_group_sao_luma_flag \|\| tile_group_sao_chroma_flag ) |  |
|     sao( xCtb >> CtbLog2SizeY, yCtb >> CtbLog2SizeY ) |  |
|   if( tile_group_alf_enabled_flag ){ |  |
|     alf_ctb_flag[ 0 ][ xCtb >> Log2CtbSize ][ yCtb >> Log2CtbSize ] | ae(v) |
|     if( alf_chroma_idc = = 1 \|\| alf_chroma_idc = = 3 ) |  |
|       alf_ctb_flag[ 1 ][ xCtb >> Log2CtbSize ][ yCtb >> Log2CtbSize ] | ae(v) |
|     if( alf_chroma_idc = = 2 \|\| alf_chroma_idc = = 3 ) |  |
|       alf_ctb_flag[ 2 ][ xCtb >> Log2CtbSize ][ yCtb >> Log2CtbSize ] | ae(v) |
|   } |  |
|   *if( tile_group_chroma_residual_scale_flag )* |  |
|     *ctu_chroma_residual_scale_flag* |  |
|   if( tile_group_type = = I && qtbtt_dual_tree_intra_flag ) |  |
|     dual_tree_implicit_qt_split ( xCtb, yCtb, CtbSizeY, 0 ) |  |
|   else |  |
|     coding_tree( xCtb, yCtb, CtbSizeY, CtbSizeY, 1, 0, 0, 0, 0, 0, SINGLE_TREE ) |  |
| } |  |

According to these variants, the activation in the CTU of chroma residual scaling is conditioned by the value of the flag ctu_chroma_residual_scale_flag.

Example of Specification Syntax Adaptation According to Embodiment 2

Example of syntax changes in the current VVC draft specification (see Benjamin Bross et al. "Versatile Video Coding (Draft 4)", JVET 13th Meeting: Marrakech, MA, 9-18 Jan. 2019, JVET-M1001-v7) according to the embodiment 2 are provided below. The changes compared to JVET-M1001 are highlighted in grey.

8.4.3 Derivation Process for Chroma Ultra Prediction Mode

Input to this process are:

a luma location (xCb, yCb) specifying the top-left sample of the current chroma coding block relative to the top-left luma sample of the current picture, a variable cbWidth specifying the width of the current coding block in luma samples, a variable cbHeight specifying the height of the current coding block in luma samples.

In this process, the chroma intra prediction mode IntraPredModeC[xCb][yCb] is derived.

A variable lmEnabled is set equal to sps_cclm_enabled_flag.

When the following conditions are true, lmEnabled is derived by invoking the process Cross-component chroma intra prediction mode checking process.

lmEnabled is equal to 1, tile_group_type is equal to 2 (I tile group), qtbtt_dual_tree_intra_flag is equal to 1.

The chroma intra prediction mode IntraPredModeC[xCb][yCb] is derived using intra_chroma_pred_mode[xCb][yCb] and IntraPredModeY[xCb+cbWidth/2][yCb+cbHeight/2] as specified in Table 8-2 and Table 8-3.

TABLE 8-2

Specification of IntraPredModeC[ xCb ][ yCb ] depending
on intra_chroma_pred_mode[ xCb ][ yCb ]
and IntraPredModeY[ xCb + cbWidth / 2 ][
yCb + cbHeight / 2 ] when ImEnabled is equal to 0

| intra_chroma_pred_mode[ xCb ][ yCb ] | IntraPredModeY[ xCb + cbWidth / 2 ][ yCb + cbHeight / 2 ] | | | | |
|---|---|---|---|---|---|
| | 0 | 50 | 18 | 1 | X ( 0 <= X <= 66 ) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |

TABLE 8-3

Specification of IntraPredModeC[ xCb ][ yCb ] depending
on intra_chroma_pred_mode[ xCb ][ yCb ]
and IntraPredModeY[ xCb + cbWidth / 2 ][
yCb + cbHeight / 2 ] when ImEnabled is equal to 1

| intra_chroma_pred_mode[ xCb ][ yCb ] | IntraPredModeY[ xCb + cbWidth / 2 ][ yCb + cbHeight / 2 ] | | | | |
|---|---|---|---|---|---|
| | 0 | 50 | 18 | 1 | X ( 0 <= X <= 66 ) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 81 | 81 | 81 | 81 | 81 |
| 5 | 82 | 82 | 82 | 82 | 82 |
| 6 | 83 | 83 | 83 | 83 | 83 |
| 7 | 0 | 50 | 18 | 1 | X |

Cross-Component Chroma Intra Prediction Mode Checking Process

Input to this process are:

a luma location (xCb, yCb) specifying the top-left sample of the current chroma coding block relative to the top-left luma sample of the current picture, a variable cbWidth specifying the width of the current coding block in luma samples, a variable cbHeight specifying the height of the current coding block in luma samples.

Output to this process is:

a flag ImEnabled specifying if a cross-component chroma intra prediction mode is enabled or not for the current chroma coding block.

In this process, ImEnabled is derived as follows.

If ((16+xCb)/16) is not equal to ((16+xCb+cbWidth−1)/16) or ((16+yCb)/16) is not equal to ((16+yCb+cbHeight−1)/16), cclmEnabled is set equal to 0

Otherwise the following applies.

For i=0, (cbHeight−1) and j=0 . . . (cbWidth−1), the following applies.

(xTL, yTL) is set equal to the top-left sample location relative to the top-left luma sample of the current picture of the collocated luma coding block ColLumaBlock covering the location given by ((xCb+j)<<1, (yCb+i)<<1)).

wColoc and hColoc are set equal to the width and height of ColLumaBlock.

If one of the following conditions is false, cclmEnabled is set equal to 0, and the loop over i and j is stopped.

((32+xTL)/32) is equal to ((32+xTL+wColoc−1)/32)

((32+yTL)/32) is equal to ((32+yTL+hColoc−1)/32)

When cclmEnabled is equal to 1, the following applies for i=1 . . . (cbHeight−2) and j=0, (cbWidth−1).

(xTL, yTL) is set equal to the top-left sample location relative to the top-left luma sample of the current picture of the collocated luma coding block ColLumaBlock covering the location given by ((xCb+j)<<1, (yCb+i)<<1)).

wColoc and hColoc are set equal to the width and height of ColLumaBlock.

If one of the following conditions is false, cclmEnabled is set equal to 0, and the loop over i and j is stopped.

((32+xTL)/32) is equal to ((32+xTL+wColoc−1)/32)

((32+yTL)/32) is equal to ((32+yTL+hColoc−1)/32)

Example of Specification Syntax Adaptation According to Embodiment 10

Example of syntax for inclusion in the current VVC draft specification (e.g. document JVET-M1001) according to the embodiment 10 are provided below.

Picture reconstruction with mapping process for chroma sample value Inputs to this process are:

an (nCurrSw×2)×(nCurrSh×2) array mapped predMapSamples specifying the mapped luma predicted samples of the current block, when tile_group_type is equal to 2 (I tile group) and qtbtt_dual_tree_intra_flag is equal to 1, an array recSamples specifying the reconstructed luma of the current picture, an (nCurrSw)×(nCurrSh) array predSamples specifying the chroma predicted samples of the current block, an (nCurrSw)×(nCurrSh) array resSamples specifying the chroma residual samples of the current block.

The array InputPivot[i] and ReshapePivot[i], ] with i in the range of 0 to MaxBinIdx+1, inclusive, derived in 7.4.4.1.

The array InvScaleCoeff[i] and ChromaScaleCoef[i] with i in the range of 0 to MaxBinIdx, inclusive, derived in 7.4.4.1.

The output for this process is reconstructed chroma sample array recSamples.

The recSamples is derived as follows:

If (!tile_group_reshaper_chroma_residual_scale_flag|| ((nCurrSw)×(nCurrSh)<=4))

recSamples[xCurr+i][yCurr+j]=Clip1$_C$ (predSamples[i][j]+ resSamples[i][j])

with i=0 . . . nCurrSw−1, j=0 . . . nCurrSh−1

Otherwise (tile_group_reshaper_chroma_residual_scale_flag && ((nCurrSw)×(nCurrSh)>4)), the following applies:

The variable varScale is derived as follows:

invAvgLuma is derived as follows:

If tile_group_type is equal to 2 (I tile group) and qtbtt_dual_tree_intra_flag is equal to 1, the following applies.

The chroma location (xCh, yCh) of the top-left sample of the chroma current block relative to the top-left chroma sample of the current picture is identified.

The luma location (xTL, yTL) is set equal to the top-left sample location of the collocated luma coding block ColLumaBlock covering the location given by (xCh<<1, yCh<<1) relative to the top-left luma sample of the current picture, and wColoc and hColoc are set equal to the width and height of ColLumaBlock.

If ((32+yCh)/32) is equal to ((64+yTL−1)/64), invAvgLuma is set equal to recSamples[yTL−1][xTL]

Otherwise if ((32+xCh)/32) is equal to ((64+xTL−1)/64), invAvgLuma is set equal to recSamples[yTL][xTL−1]

Otherwise invAvgLuma is set equal to −1.

Otherwise, the following applies:

invAvgLuma=Clip1$_Y$(($\Sigma_i \Sigma_j$ predMapSamples[i][j]+ nCurrSw*nCurrSh*2)/(nCurrSw*nCu rrSh*4))

If invAvgLuma is not equal to −1, the following applies:
the variable idxYInv is derived by involving the identification of piece-wise function index as specified in clause 8.5.6.2 with the input of sample value invAvgLuma.

varScale is set equal to ChromaScaleCoef[idxYInv]

Otherwise varScale is set equal to (1<<shiftC)

The recSamples is derived as follows:

If tu_cbf_cIdx [xCurr][yCurr] equal to 1, the following applies: shiftC=11
recSamples[xCurr+i][yCurr+j]=ClipCidx1 (predSamples[i][j]+Sign(resSamples[i][j]) ((Abs(resSamples[i][j])*varScale+(1<<(shiftC−1))) >>shiftC
))
with i=0 . . . nCurrSw−1, j=0 . . . nCurrSh−1

Otherwise (tu_cbf_cIdx[xCurr][yCurr] equal to 0)
recSamples[xCurr+i][yCurr+j]=ClipCidx1(predSamples[i][j]) with i=0 . . . nCurrSw−1, j=0 . . . nCurrSh−1

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well. The aspects described and contemplated in this application can be implemented in many different forms. FIGS. 26, 27 and 28 below provide some embodiments, but other embodiments are contemplated and the discussion of FIGS. 26, 27 and 28 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the image partitioning and scaling modules (102, 151, 235 and 251) of a video encoder 100 and decoder 200 as shown in FIG. 26 and FIG. 27. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application, for example, Wmax, Hmax, WmaxC and HmaxC. The specific values are for example purposes and the aspects described are not limited to these specific values.

FIG. 26 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. The encoder may perform a forward mapping (191) applied to luma samples to obtain the predicted luma block. For chroma samples, the forward mapping would not apply. Prediction residuals are calculated, for example, by subtracting (110) the predicted block from the original image block. For chroma samples, a chroma residual scaling may apply to the chroma residuals (111).

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions.

The quantized transform coefficients are de-quantized (140), inverse transformed (150) to decode prediction residuals. The chroma residuals are then processed by the inverse scaling (151), that performs the inverse process of the scaling process (111). Combining (155) the decoded prediction residuals and the predicted block, an image block is reconstructed. For luma samples, an inverse mapping (190) may apply, this step being the inverse of the forward mapping step (191). In-loop filters (165) are applied to the reconstructed picture to perform, for example, deblocking/SAO (Sample Adaptive Offset), Adaptive Loop-Filter (ALF)

filtering to reduce encoding artifacts. The filtered image is stored at a reference picture buffer (180).

FIG. 27 illustrates a block diagram of a video decoder 200. In the decoder 200, a bitstream is decoded by the decoder elements as described below. Video decoder 200 generally performs a decoding pass reciprocal to the encoding pass as described in FIG. 26. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240), inverse transformed (250) to decode the prediction residuals. For chroma samples, chroma residuals are process by an inverse scaling (251), that is similar to the inverse scaling (151) of the encoder. Combining (255) the decoded prediction residuals and the predicted block, an image block is reconstructed. The predicted block can be obtained (270) from intra prediction (260) or motion-compensated prediction (i.e., inter prediction) (275). Forward mapping (295) may be applied to luma samples after prediction. Inverse mapping (296), similar to the inverse mapping (190) of the encoder, may apply to the reconstructed luma samples. Then in-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 28 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 28, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing. Within the integrated housing, the various elements can be interconnected and transmit data therebetween using suitable connection arrangement 1140, for example, an internal bus as known in the art, including the Inter-IC (I2C) bus, wiring, and printed circuit boards. The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip. The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, enabling a cross-component dependent tool to be used for a chroma block responsive to a size of the chroma block and to a size of at least one luma block co-located with at least one sample of the chroma block.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, enabling a cross-component dependent tool to be used for a chroma block responsive to a size of said chroma block and to a size of at least one luma block co-located with at least one sample of the chroma block.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, for example, an index of the chroma scaling factor, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a chroma scaling factor index. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination, across various claim categories and types. Further, embodiments can include one or more of the following features, devices, or aspects, alone or in any combination, across various claim categories and types:

Enabling a cross-component dependent tool responsive to a size of a chroma block and possibly to a size of at least one luma block co-located with the chroma block.

Enabling a cross-component dependent tool in the case where the chroma block is inside a single chroma rectangular area being defined by partitioning the chroma component of the picture into non-overlapping rectangular areas;

Enabling a cross-component dependent tool in the case where at least one co-located luma block is inside a luma rectangular area co-located with a first chroma rectangular area, said luma rectangular area being defined by partitioning the luma of said picture into non-overlapping rectangular areas;

A bitstream or signal that includes one or more of the described syntax elements, or variations thereof.

A bitstream or signal that includes syntax conveying information generated according to any of the embodiments described.

Inserting in the signaling syntax elements that enable the decoder to enable/disable a cross-component dependent tool in a manner corresponding to that used by an encoder.

Creating and/or transmitting and/or receiving and/or decoding a bitstream or signal that includes one or more of the described syntax elements, or variations thereof.

Creating and/or transmitting and/or receiving and/or decoding according to any of the embodiments described.

A method, process, apparatus, medium storing instructions, medium storing data, or signal according to any of the embodiments described.

A TV, set-top box, cell phone, tablet, or other electronic device that performs enabling/disabling a cross-component dependent tool according to any of the embodiments described.

A TV, set-top box, cell phone, tablet, or other electronic device that performs enabling/disabling a cross-component dependent tool according to any of the embodiments described, and that displays (e.g. using a monitor, screen, or other type of display) a resulting image.

A TV, set-top box, cell phone, tablet, or other electronic device that selects (e.g. using a tuner) a channel to receive a signal including an encoded image, and performs enabling/disabling a cross-component dependent tool according to any of the embodiments described.

A TV, set-top box, cell phone, tablet, or other electronic device that receives (e.g. using an antenna) a signal over the air that includes an encoded image, and performs enabling/disabling a cross-component dependent tool according to any of the embodiments described.

Further, embodiments can include one or more of the following features, devices, or aspects, alone or in any combination, across various claim categories and types.

According to a general aspect of at least one embodiment, a decoding method is presented that comprises:
- enabling a cross-component dependent tool to be used for a chroma block of a picture responsive to a size of said chroma block and to a size of at least one luma block co-located with the chroma block;
- decoding said chroma block responsive to said enablement of said cross-component dependent tool.

According to a general aspect of at least one embodiment, a decoding apparatus is presented that comprises one or more processors configured to perform:
- enabling a cross-component dependent tool to be used for a chroma block of a picture responsive to a size of said chroma block and to a size of at least one luma block co-located with the chroma block; and
- decoding said chroma block responsive to said enablement of said cross-component dependent tool.

According to a general aspect of at least one embodiment, an encoding method is presented that comprises:
- enabling a cross-component dependent tool to be used for a chroma block of a picture responsive to a size of said chroma block and to a size of at least one luma block co-located with the chroma block;
- encoding said chroma block responsive to said enablement of said cross-component dependent tool.

According to a general aspect of at least one embodiment, an encoding apparatus is presented that comprises one or more processors configured to perform:
- enabling a cross-component dependent tool to be used for a chroma block of a picture responsive to a size of said chroma block and to a size of at least one luma block co-located with the chroma block; and
- encoding said chroma block responsive to said enablement of said cross-component dependent tool.

One or more of the present embodiments also provide a computer readable storage medium having stored thereon instructions for encoding or decoding video data according to at least part of any of the methods described above. One or more embodiments also provide a computer readable storage medium having stored thereon a bitstream generated according to the encoding methods described above. One or more embodiments also provide a method and apparatus for transmitting or receiving the bitstream generated according to the encoding methods described above. One or more embodiments also provide a computer program product including instructions for performing at least part of any of the methods described above.

In one embodiment, said cross-component dependent tool is a luma-dependent chroma residual scaling.

In one embodiment, enabling said luma-dependent chroma residual scaling to be used for a chroma block of a picture responsive to a size of said chroma block and to a size of at least one luma block co-located with the chroma block comprises:
- enabling said luma-dependent chroma residual scaling in the case where:
  - the chroma block is inside a single chroma rectangular area, said chroma rectangular area being defined by partitioning the chroma component of said picture into non-overlapping rectangular areas; and
  - the at least one luma block co-located with the chroma block is inside a single luma rectangular area co-located with said chroma rectangular area, said luma rectangular area being defined by partitioning the luma of said picture into non-overlapping rectangular areas; and
- disabling said luma-dependent chroma residual scaling otherwise.

In one embodiment, enabling said luma-dependent chroma residual scaling to be used for a chroma block of a picture responsive to a size of said chroma block and to a size of at least one luma block co-located with the chroma block comprises:
- enabling said luma-dependent chroma residual scaling in the case where:
  - the chroma block is inside a single chroma rectangular area, said chroma rectangular area being defined by partitioning the chroma component of said picture into non-overlapping rectangular areas; and
  - all luma blocks co-located with the chroma block are inside a single luma rectangular area co-located with said chroma rectangular area, said luma rectangular area being defined by partitioning the luma of said picture into non-overlapping rectangular areas; and
- disabling said luma-dependent chroma residual scaling otherwise.

In one embodiment, enabling said luma-dependent chroma residual scaling to be used for a chroma block of a picture responsive to a size of said chroma block and to a size of at least one luma block co-located with the chroma block comprises:
- enabling said luma-dependent chroma residual scaling in the case where the at least one luma block co-located with the chroma block is inside a single luma rectangular area co-located with a first chroma rectangular area, said chroma rectangular area being defined by partitioning the chroma component of said picture into non-overlapping rectangular areas and said luma rectangular area being defined by partitioning the luma of said picture into non-overlapping rectangular areas; and
- disabling said luma-dependent chroma residual scaling otherwise.

In one embodiment, in the case where said luma-dependent chroma residual scaling is disabled, a scaling factor is determined for said chroma block by prediction from a chroma scaling factor or from an index identifying a chroma scaling factor associated with at least one decoded (encoded respectively) chroma block neighboring said chroma block.

In one embodiment, in the case where said luma-dependent chroma residual scaling is disabled, a delta quantization parameter is decoded from (encoded in, respectively) the bitstream for said chroma block.

In another embodiment, the cross-component dependent tool is a cross-component linear model prediction.

The invention claimed is:

1. A method for controlling the use of a chroma residual scaling tool for a chroma block of a picture divided in non-overlapping rectangular areas forming a grid of authorized rectangular areas, the method comprising, in the condition that the chroma block is inside a single chroma authorized rectangular area and the luma block co-located with the chroma block is inside a single luma authorized rectangular area co-located with said chroma authorized rectangular area:
- enabling the chroma residual scaling tool, and
- determining a scaling factor for the chroma residual scaling tool based on one or more reconstructed luma samples which belong to the bottom line and/or the right column of luma samples which respectively belong to the top and left neighboring authorized rectangular areas of the authorized rectangular areas that contains the current chroma block.

2. The method according to claim 1 wherein the chroma residual scaling tool is enabled responsively to size and position constraints of co-located chroma and luma blocks.

3. The method according to claim 2 wherein the constraint of size of said chroma block is 32×32 pixels and the constraint of size of at least one luma block co-located with the chroma block is 64×64 pixels.

4. A decoding method comprising, for a chroma block of a picture:
   determining the position in the picture of a given sample position in a chroma block,
   determining a co-located luma block being a luma block comprising the luma sample co-located with the position in the chroma block,
   determining the use of a chroma residual scaling tool according to claim 1,
   in the condition that the chroma residual scaling tool is enabled, applying a scaling of the chroma block residual according to the scaling factor determined according to claim 1, and
   decoding said chroma block.

5. A non-transitory computer readable medium containing computer program product comprising instructions for performing the method of claim 4, when executed by one of more processors.

6. An encoding method comprising, for a chroma block of a picture:
   determining the position in the picture of a given sample position in a chroma block,
   determining a co-located luma block being a luma block comprising the luma sample co-located with the position in the chroma block,
   determining the use of a chroma residual scaling tool according to claim 1,
   in the condition that the chroma residual scaling tool is enabled, applying a scaling of the chroma block residual according to the scaling factor determined according to claim 1, and
   encoding said chroma block.

7. The method according to claim 6 wherein the chroma residual scaling tool is enabled responsively to size and position constraints of co-located chroma and luma blocks.

8. The method according to claim 7 wherein the constraint of size of said chroma block is 32×32 pixels and the constraint of size of at least one luma block co-located with the chroma block is 64×64 pixels.

9. A non-transitory computer readable medium containing computer program product comprising instructions for performing the method of claim 6, when executed by one of more processors.

10. A non-transitory computer readable medium containing computer program product comprising instructions for performing the method of claim 1, when executed by one of more processors.

11. A decoding apparatus comprising one or more processors configured to perform a decoding method comprising, for a chroma block of a picture divided in non-overlapping rectangular areas forming a grid of authorized rectangular areas:
   determining the position in the picture of a given sample position in a chroma block,
   determining a co-located luma block being a luma block comprising the luma sample co-located with the position in the chroma block,
   in the condition that the chroma block is inside a single chroma authorized rectangular area and the luma block co-located with the chroma block is inside a single luma authorized rectangular area co-located with said chroma authorized rectangular area, applying a scaling of the chroma block residual according to a scaling factor determined based on one or more reconstructed luma samples which belong to the bottom line and/or the right column of luma samples which respectively belong to the top and left neighboring authorized rectangular areas of the authorized rectangular areas that contains the current chroma block, and
   decoding said chroma block.

12. The decoding apparatus according to claim 11 wherein the chroma residual scaling tool is enabled responsively to size and position constraints of co-located chroma and luma blocks.

13. The decoding apparatus according to claim 12 wherein the constraint of size of said chroma block is 32×32 pixels and the constraint of size of at least one luma block co-located with the chroma block is 64×64 pixels.

14. An encoding apparatus comprising one or more processors configured to perform an encoding method comprising, for a chroma block of a picture divided in non-overlapping rectangular areas forming a grid of authorized rectangular areas:
   determining the position in the picture of a given sample position in a chroma block,
   determining a co-located luma block being a luma block comprising the luma sample co-located with the position in the chroma block,
   in the condition that the chroma block is inside a single chroma authorized rectangular area and the luma block co-located with the chroma block is inside a single luma authorized rectangular area co-located with said chroma authorized rectangular area, applying a scaling of the chroma block residual according to a scaling factor determined based on one or more reconstructed luma samples which belong to the bottom line and/or the right column of luma samples which respectively belong to the top and left neighboring authorized rectangular areas of the authorized rectangular areas that contains the current chroma block, and encoding said chroma block.

15. The encoding apparatus according to claim 14 wherein the chroma residual scaling tool is enabled responsively to size and position constraints of co-located chroma and luma blocks.

16. The encoding apparatus according to claim 15 wherein the constraint of size of said chroma block is 32×32 pixels and the constraint of size of at least one luma block co-located with the chroma block is 64×64 pixels.

* * * * *